US012677838B2

(12) United States Patent (10) Patent No.: US 12,677,838 B2

Proulx et al. (45) Date of Patent: Jul. 14, 2026

(54) FOOD PROCESSING DEVICE, COMPONENTRY, AND RELATED METHODS

(71) Applicant: SharkNinja Operating LLC, Needham, MA (US)

(72) Inventors: Jared Proulx, Northborough, MA (US); Pierce Barnard, Manly (AU); Travis Marks, Needham, MA (US); Helen Williams, Needham, MA (US); Jonathan James, Witney (GB); Lukas Tubby, London (GB); Nathan Lyell, Surrey (GB)

(73) Assignee: SharkNinja Operating LLC, Needham, MA (US)

( * ) Notice: Subject to any disclaimer, the term of this patent is extended or adjusted under 35 U.S.C. 154(b) by 86 days.

(21) Appl. No.: 18/379,499

(22) Filed: Oct. 12, 2023

(65) Prior Publication Data

US 2024/0358027 A1     Oct. 31, 2024

Related U.S. Application Data

(60) Provisional application No. 63/462,666, filed on Apr. 28, 2023.

(51) Int. Cl.
A21C 11/16 (2006.01)
A21C 1/02 (2006.01)
(Continued)

(52) U.S. Cl.
CPC ............... A21C 11/16 (2013.01); A21C 1/02 (2013.01); A21C 1/142 (2013.01); A21C 1/1465 (2013.01); A47J 43/046 (2013.01); A47J 43/0716 (2013.01)

(58) Field of Classification Search
CPC ......... A21C 11/16; A21C 1/02; A21C 1/1485; A23P 30/20; B01F 27/95
See application file for complete search history.

(56) References Cited

U.S. PATENT DOCUMENTS 2,003,829 A 6/1935 Gilbert et al.
3,126,196 A 3/1964 Staeger
(Continued)

FOREIGN PATENT DOCUMENTS

CN 103767570 A 5/2014
CN 104094993 A 10/2014
(Continued)

OTHER PUBLICATIONS

English Translation for KR 10-2011-0103504 (Year: 2011).*
(Continued)

*Primary Examiner* — Seyed Masoud Malekzadeh
(74) *Attorney, Agent, or Firm* — The Webb Law Firm

(57) ABSTRACT

Food processing devices capable of performing multiple functions, including mixing and extruding pasta or other food products, are described. The food processing devices have a door assembly with a feed chute extending from an opening in the mixing bowl and leading to an extruder. The door assembly can be closed or opened, depending on the type of food processing to be performed. The food processing device mixes food ingredients within the mixing bowl while the door assembly is in a closed position. When the food ingredients are sufficiently mixed, the door assembly is moved to an open position to allow the mixed food ingredients to flow through the feed chute to the extruder. The disclosed food processing devices conveniently allow for both mixing and extruding of food products within a single device configured to efficiently and safely perform both tasks.

8 Claims, 16 Drawing Sheets

(51) Int. Cl.
A21C 1/14         (2006.01)
A47J 43/046       (2006.01)
A47J 43/07        (2006.01)

(56)                References Cited

U.S. PATENT DOCUMENTS

| | | | |
|---|---|---|---|
| 3,393,900 A | 7/1968 | Wagner et al. | |
| 4,146,333 A | 3/1979 | Zani | |
| 4,219,318 A | 8/1980 | Cavalli | |
| 4,269,582 A | 5/1981 | Mella | |
| 4,332,539 A * | 6/1982 | Zani | A47J 43/04 |
| | | | 425/151 |
| 4,406,603 A | 9/1983 | Williams | |
| 4,432,912 A | 2/1984 | Berler | |
| 4,453,831 A | 6/1984 | Mahon | |
| 4,599,003 A | 7/1986 | Schiebelhuth et al. | |
| 5,393,217 A | 2/1995 | Cheng | |
| 5,401,159 A | 3/1995 | Hsu | |
| 5,460,506 A | 10/1995 | Price | |
| 6,312,246 B1 | 11/2001 | Pozzobon | |
| 7,998,514 B2 | 8/2011 | Backus | |
| 8,944,357 B2 | 2/2015 | Conti et al. | |
| 9,049,965 B2 | 6/2015 | Beber et al. | |
| 9,179,802 B2 | 11/2015 | Cadorin et al. | |
| 9,420,801 B2 | 8/2016 | Cheung et al. | |
| 9,681,778 B2 | 6/2017 | Pendleton et al. | |
| 9,737,079 B2 | 8/2017 | Wang | |
| 9,999,320 B2 | 6/2018 | Dickson, Jr. et al. | |
| 10,098,356 B2 * | 10/2018 | Wang | A21C 3/04 |
| 10,098,506 B2 | 10/2018 | Dickson, Jr. et al. | |
| 10,111,558 B2 | 10/2018 | Dickson, Jr. et al. | |
| 10,124,306 B2 | 11/2018 | Dickson, Jr. et al. | |
| 10,220,362 B2 | 3/2019 | Thies et al. | |
| 10,638,885 B2 | 5/2020 | Shanmugam | |
| 10,660,341 B2 | 5/2020 | Cheung | |
| 10,717,060 B2 | 7/2020 | Dickson, Jr. et al. | |
| 11,266,270 B2 | 3/2022 | Hammond et al. | |
| 2008/0163768 A1 | 7/2008 | Glucksman et al. | |
| 2012/0113741 A1 | 5/2012 | Filipitsch et al. | |
| 2013/0033958 A1 | 2/2013 | Bravo | |
| 2022/0378249 A1 | 12/2022 | Jones et al. | |
| 2023/0057753 A1 | 2/2023 | Bayard | |
| 2023/0058496 A1 | 2/2023 | Bayard | |

FOREIGN PATENT DOCUMENTS

| | | | |
|---|---|---|---|
| CN | 204206989 U | 3/2015 | |
| CN | 104542768 A | 4/2015 | |
| CN | 104542787 A | 4/2015 | |
| CN | 104542788 A | 4/2015 | |
| CN | 106580129 A | 4/2017 | |
| CN | 106719988 A | 5/2017 | |
| CN | 107593836 A | 1/2018 | |
| CN | 108935565 A | 12/2018 | |
| CN | 108937639 A | 12/2018 | |
| CN | 109381066 A | 2/2019 | |
| CN | 109700339 A | 5/2019 | |
| CN | 208972444 U | 6/2019 | |
| CN | 210541015 U | 5/2020 | |
| CN | 210541109 U | 5/2020 | |
| CN | 210541115 U | 5/2020 | |
| CN | 211270273 U | 8/2020 | |
| CN | 112021351 A | 12/2020 | |
| CN | 112136847 A | 12/2020 | |
| CN | 112167276 A | 1/2021 | |
| CN | 112237210 A | 1/2021 | |
| CN | 112806407 A | 5/2021 | |
| CN | 112825884 A | 5/2021 | |
| CN | 213246611 U | 5/2021 | |
| CN | 113558501 A | 10/2021 | |
| CN | 114145664 A | 3/2022 | |
| CN | 216822915 U | 6/2022 | |
| CN | 216876082 U | 7/2022 | |
| DE | 102008026129 A1 | 12/2009 | |
| EP | 0022090 A2 | 1/1981 | |
| EP | 0235147 B1 | 9/1990 | |
| EP | 0406679 A1 | 1/1991 | |
| EP | 0931493 A1 | 7/1999 | |
| EP | 2326226 B1 | 12/2012 | |
| EP | 2432357 B1 | 7/2015 | |
| EP | 3199029 A1 | 8/2017 | |
| EP | 2838408 B1 | 6/2018 | |
| EP | 3542688 A1 | 9/2019 | |
| EP | 3542689 A1 | 9/2019 | |
| EP | 3733033 B1 | 12/2021 | |
| GB | 2167312 A | 5/1986 | |
| KR | 20110103504 A * | 9/2011 | A47J 43/04 |
| KR | 101102902 B1 | 1/2012 | |
| WO | 2013102315 A1 | 7/2013 | |
| WO | 2015014278 A1 | 2/2015 | |
| WO | 2015027908 A1 | 3/2015 | |
| WO | 2015052521 A1 | 4/2015 | |
| WO | 2016034596 A1 | 3/2016 | |
| WO | 2018078264 A1 | 5/2018 | |
| WO | 2018203093 A1 | 11/2018 | |

OTHER PUBLICATIONS

PCT Publication No. WO2020157336 to Koninklike Philips NV, published Aug. 6, 2020.
PCT Publication No. WO2022241916 to Eastern Elect Appl Co. Ltd., published Nov. 24, 2022.
International Search Report and Written Opinion in Application No. PCT/US2023/035124 dated Jan. 29, 2024, 11 pages.
International Search Report and Written Opinion in Application No. PCT/US2023/035128 dated Feb. 7, 2024, 12 pages.
International Search Report and Written Opinion in Application No. PCT/US2023/035130 dated Jan. 29, 2024, 13 pages.

* cited by examiner

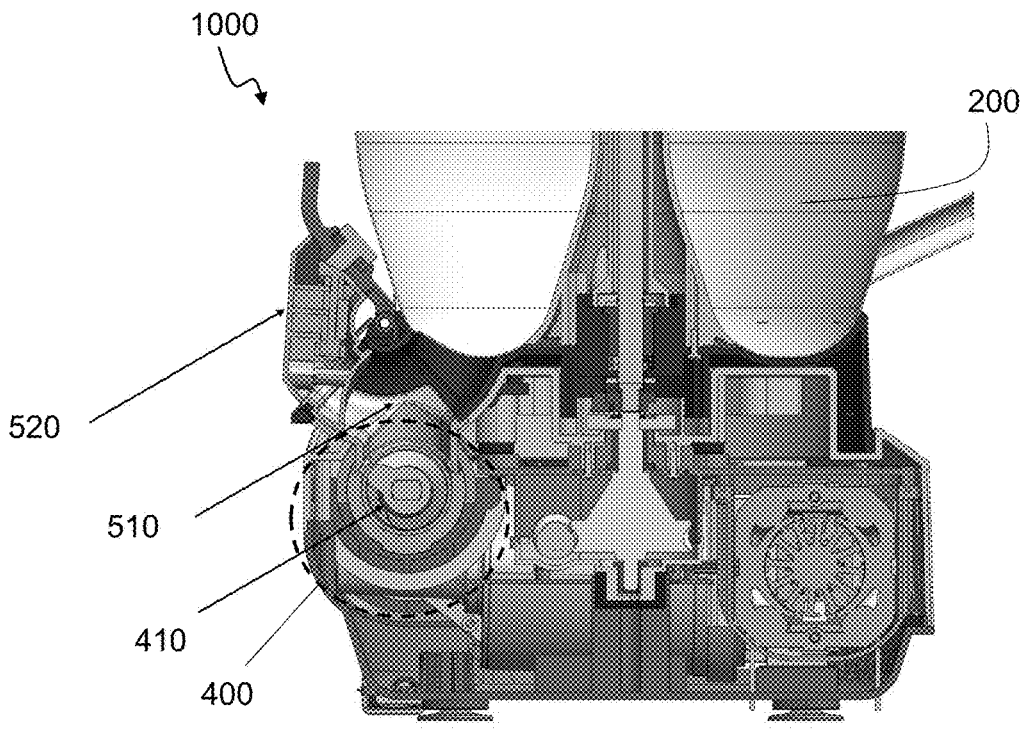
FIG. 2
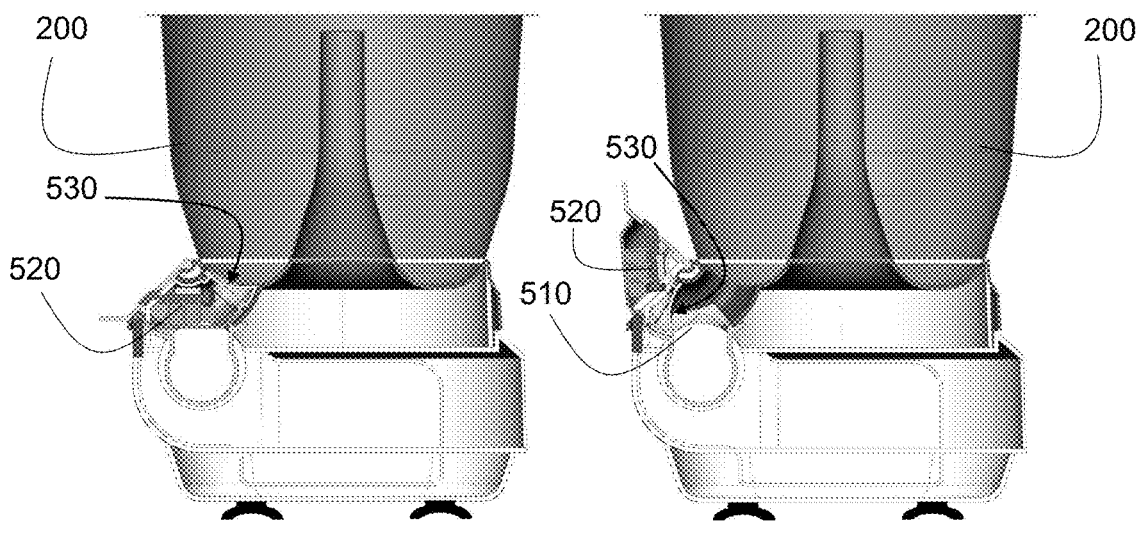
FIG. 3A          FIG. 3B

500

535

520

510

530

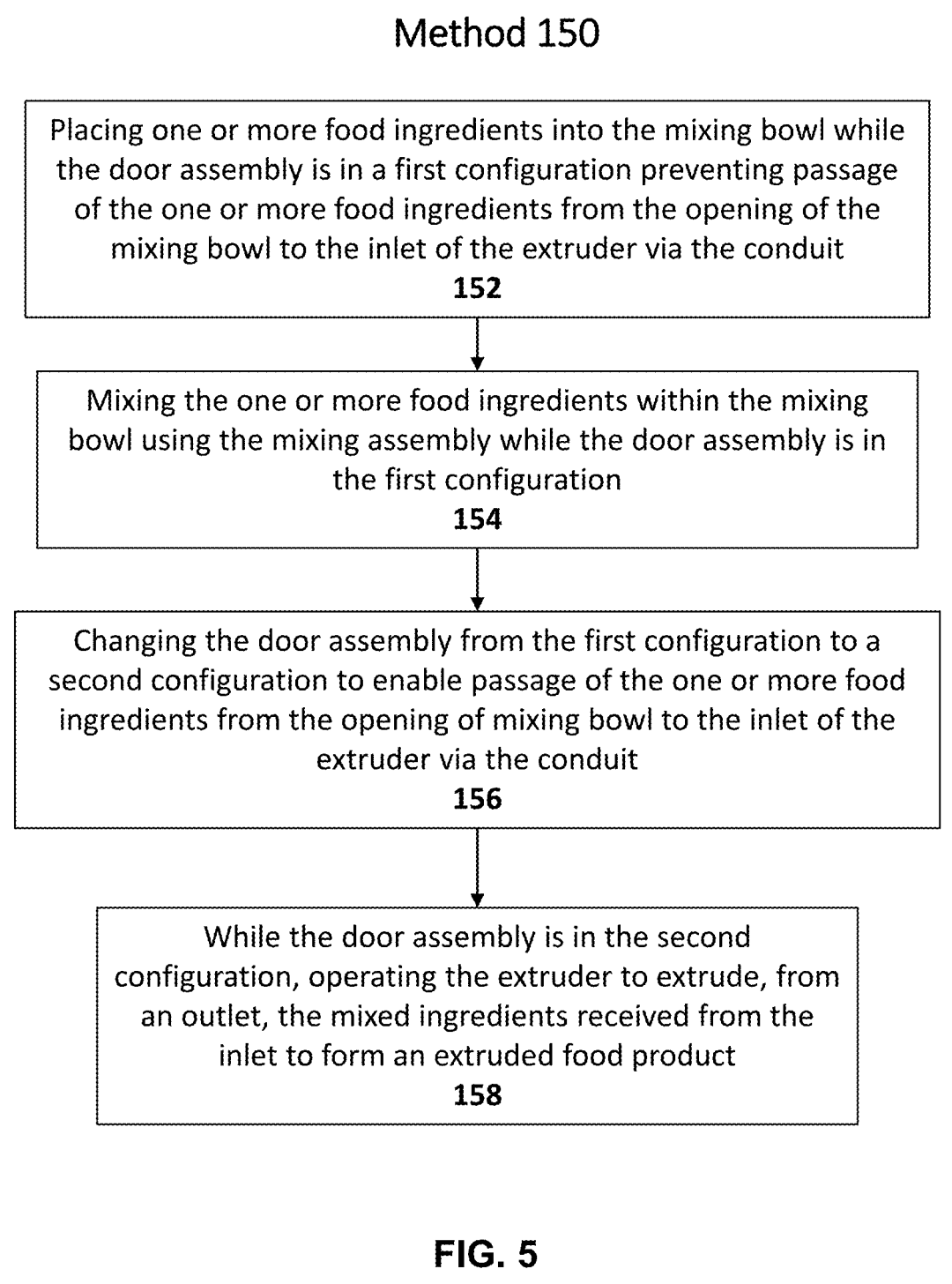

Method 150

Placing one or more food ingredients into the mixing bowl while the door assembly is in a first configuration preventing passage of the one or more food ingredients from the opening of the mixing bowl to the inlet of the extruder via the conduit
152

Mixing the one or more food ingredients within the mixing bowl using the mixing assembly while the door assembly is in the first configuration
154

Changing the door assembly from the first configuration to a second configuration to enable passage of the one or more food ingredients from the opening of mixing bowl to the inlet of the extruder via the conduit
156

While the door assembly is in the second configuration, operating the extruder to extrude, from an outlet, the mixed ingredients received from the inlet to form an extruded food product
158

FIG. 5

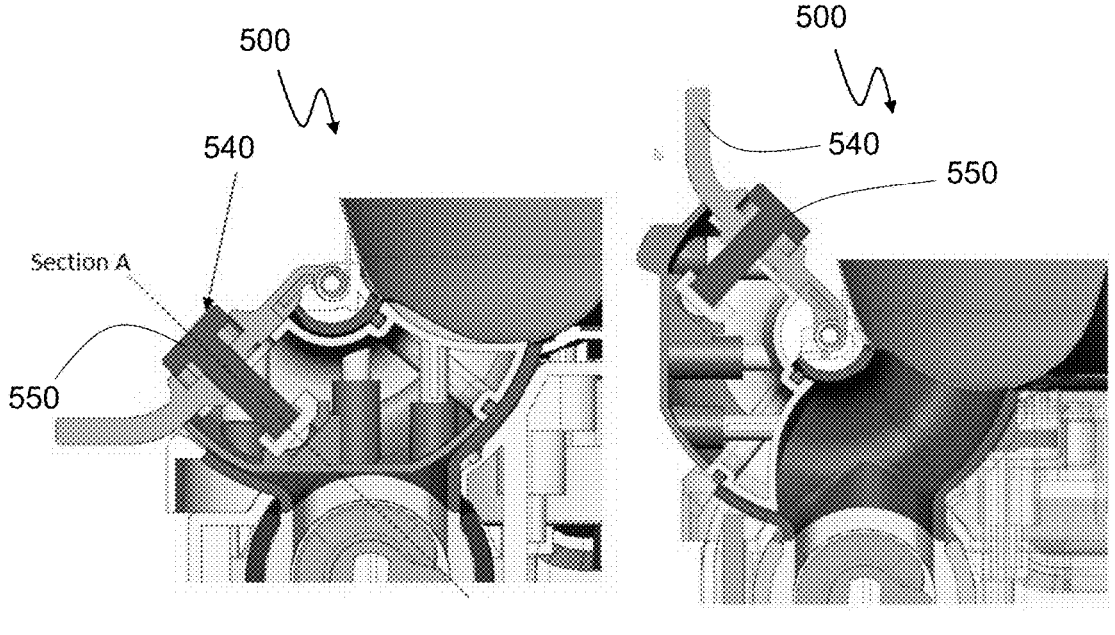
500
540
Section A
550
FIG. 8A
500
540
550
FIG. 8B
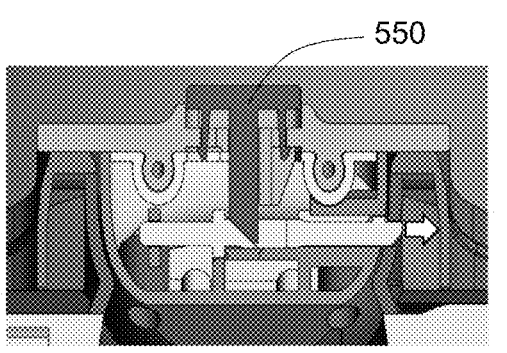
550
FIG. 8C
550
FIG. 8D

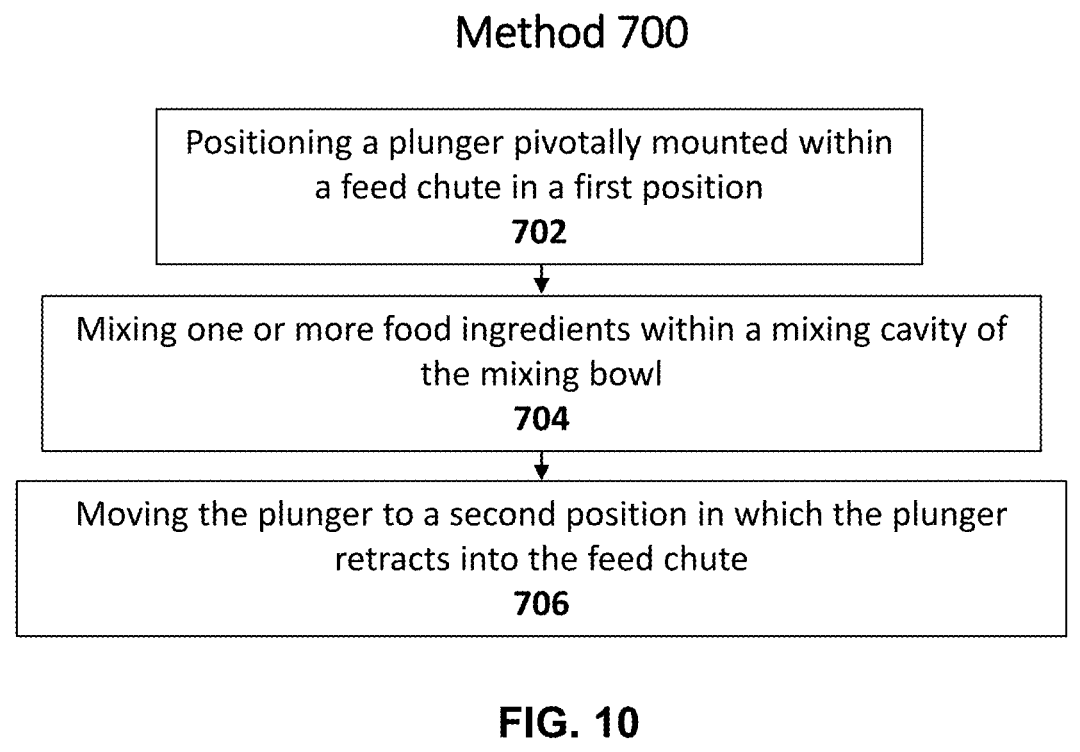

Method 700

Positioning a plunger pivotally mounted within
a feed chute in a first position
702

Mixing one or more food ingredients within a mixing cavity of
the mixing bowl
704

Moving the plunger to a second position in which the plunger
retracts into the feed chute
706

FIG. 10

Method 750

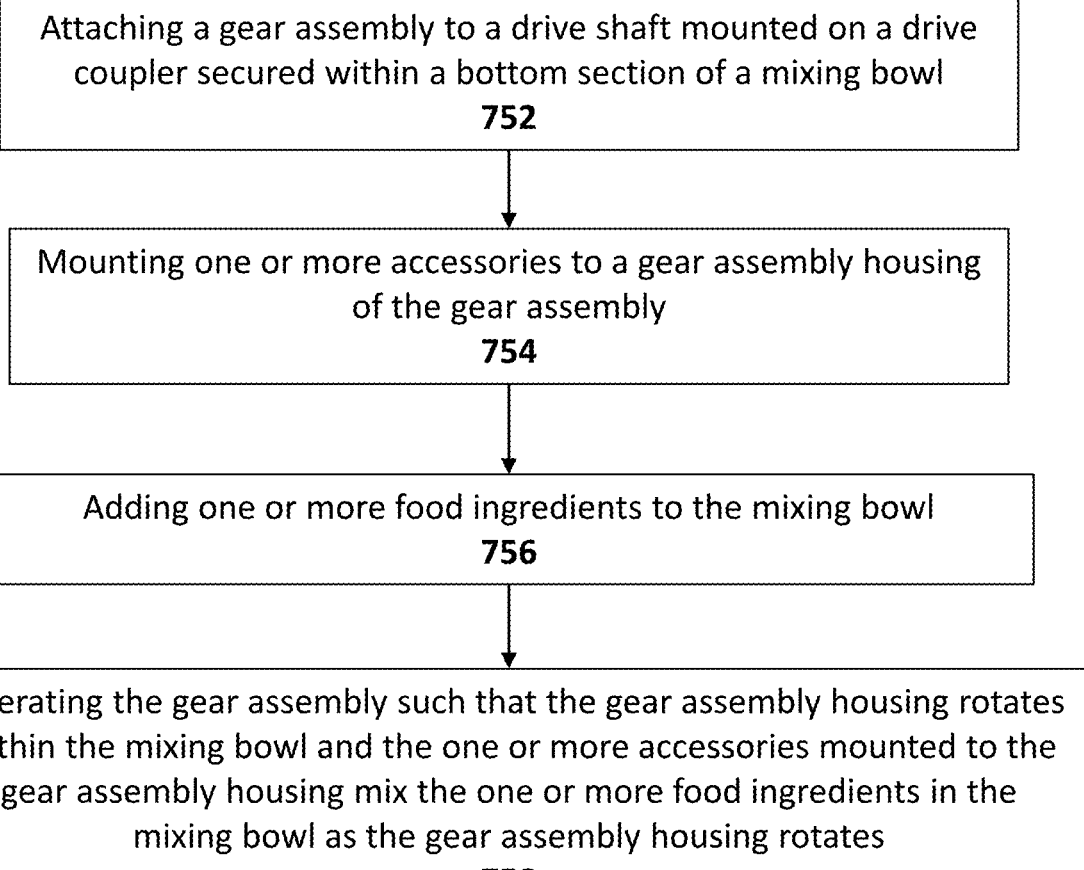

Attaching a gear assembly to a drive shaft mounted on a drive coupler secured within a bottom section of a mixing bowl
752

Mounting one or more accessories to a gear assembly housing of the gear assembly
754

Adding one or more food ingredients to the mixing bowl
756

Operating the gear assembly such that the gear assembly housing rotates within the mixing bowl and the one or more accessories mounted to the gear assembly housing mix the one or more food ingredients in the mixing bowl as the gear assembly housing rotates
758

FIG. 13

600
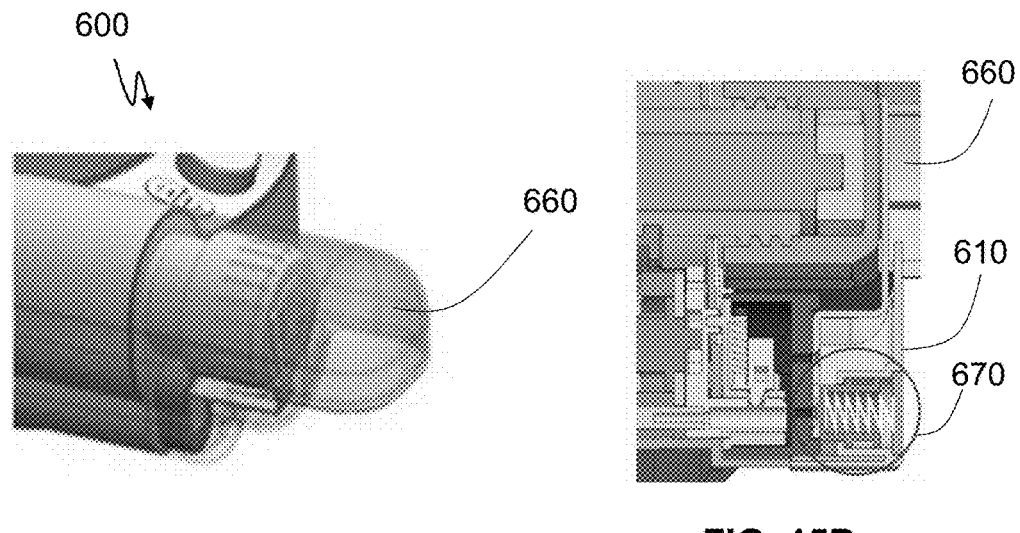
FIG. 15A
660
610
670
FIG. 15B
100
610
400
660
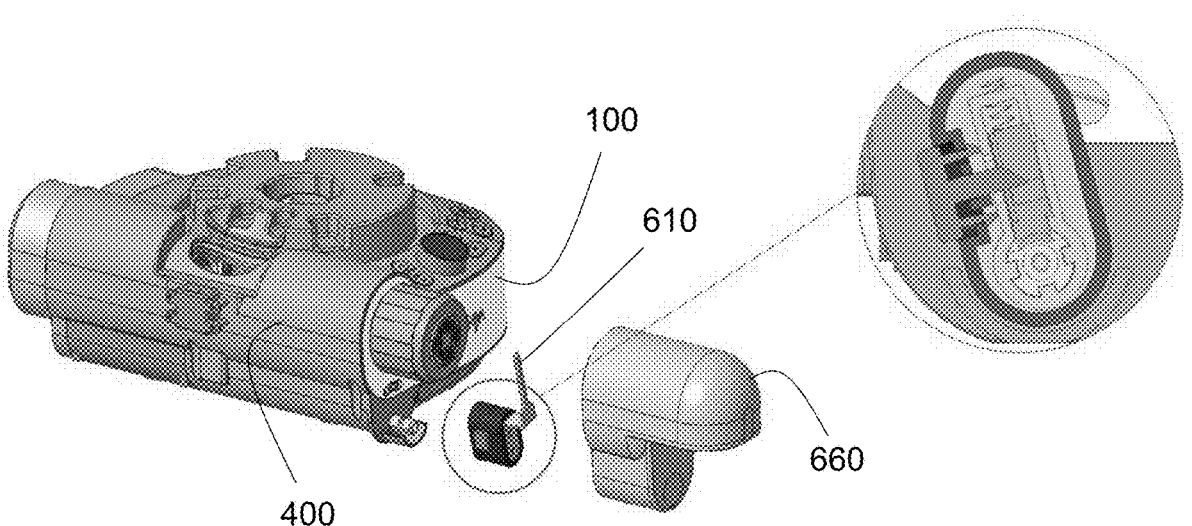
FIG. 16

Method 800

Method 950

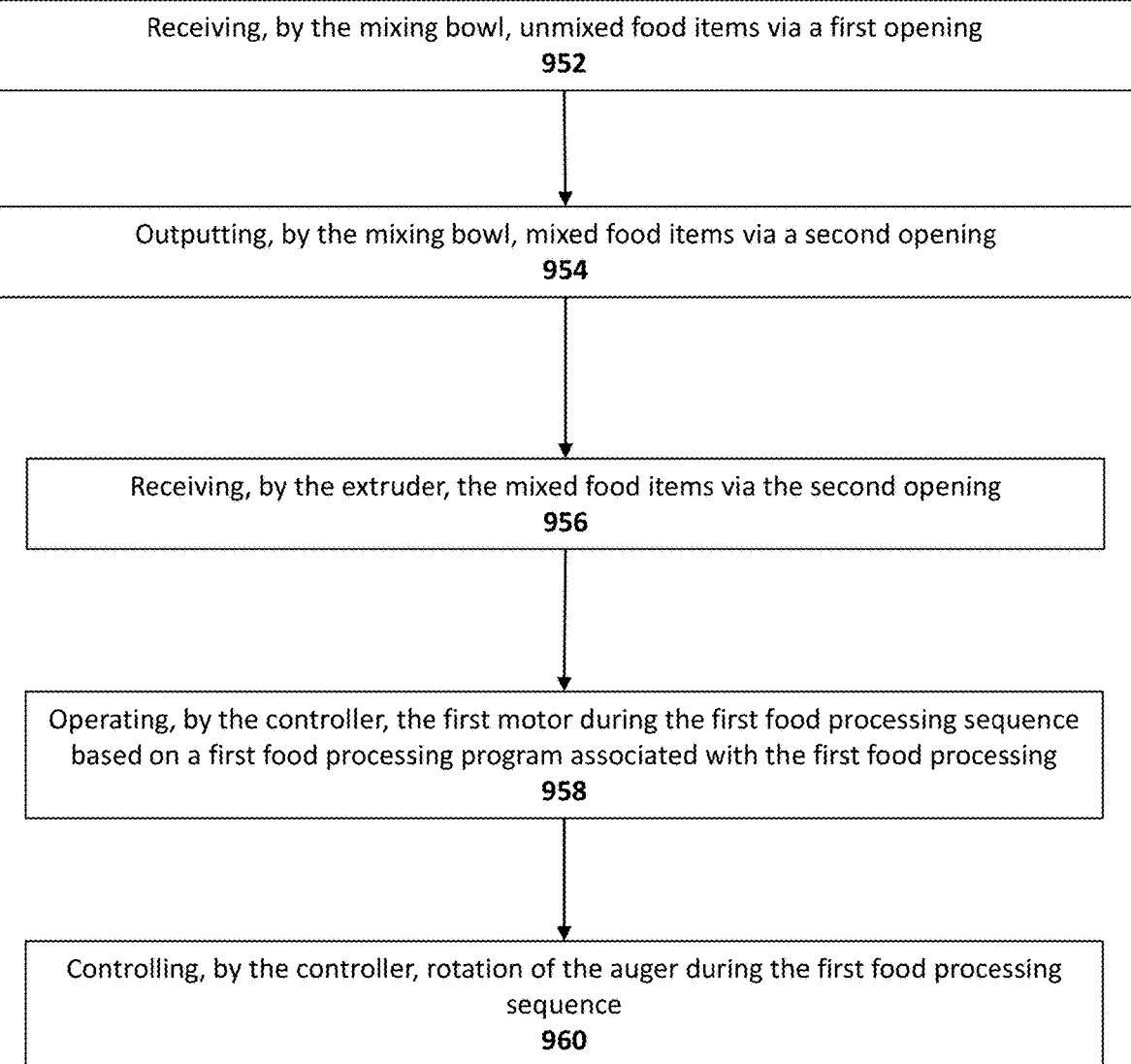

Receiving, by the mixing bowl, unmixed food items via a first opening
952

Outputting, by the mixing bowl, mixed food items via a second opening
954

Receiving, by the extruder, the mixed food items via the second opening
956

Operating, by the controller, the first motor during the first food processing sequence based on a first food processing program associated with the first food processing
958

Controlling, by the controller, rotation of the auger during the first food processing sequence
960

FIG. 19

FOOD PROCESSING DEVICE, COMPONENTRY, AND RELATED METHODS

CROSS-REFERENCE TO RELATED APPLICATION

This application claims the benefit under 35 U.S.C. § 119 (e) of U.S. Provisional Application No. 63/462,666, filed Apr. 28, 2023, the contents of which are incorporated herein by reference in their entirety.

FIELD OF THE INVENTION

The present disclosure relates to a food processing device and, more particularly, to a food processing device having a mixing bowl and an extruder connected via a door assembly, which may be used to make pasta or other extruded food products.

BACKGROUND

Home use machines that are intended to make pasta and the like are known in the art. However, existing stand mixers do not offer built-in pasta forming functionality. Instead, a user must purchase a separate add-on pasta-making accessory and store the accessory when not in use. Current methods of pasta-making for consumers also require the consumer to create dough in a vessel separate from the pasta former. The consumer must then manually move the dough to a separate attachment to form pasta. Some pasta makers allow a user to add ingredients to a vessel and then automatically form pasta, but these units are not compatible with other recipes, and thus offer limited functionality.

SUMMARY

A food processing device is described that is capable of performing multiple functions, including mixing and extruding pasta or other food products. The disclosed food processing device overcomes many shortcomings of conventional stand mixers and extruding devices. For example, the present food processing device includes a mixing bowl with a door assembly that opens the mixing cavity of the mixing bowl to a feed chute that brings food ingredients to an extruder. The door assembly can be closed or opened, depending on the particular type of food processing performed by the device at any given time. For example, the food processing device may mix food ingredients within the mixing cavity of the mixing bowl while the door assembly is in a closed position. When the food ingredients are sufficiently mixed, the door assembly may be moved to an open position to allow the mixed food ingredients to flow through the feed chute to the extruder. The disclosed food processing device thus conveniently allows for both mixing and extruding of food products with a single device configured to efficiently perform both tasks.

A gear assembly is also disclosed for the food processing device. In contrast to gear assemblies of conventional stand mixers, which are driven from above, the present gear assembly is bottom driven, which permits both wet and dry ingredients to be easily added to the mixing bowl. The gear assembly is also configured to accommodate multiple accessory attachments, such as a beater, a dough hook, and/or a scraper so that while dough is being formed in the mixing bowl, the dough can be folded and kneaded simultaneously to produce a high-quality food product.

A cutting device is also disclosed to cut extruded food products. The disclosed cutting device can be used in connection with the disclosed food processing device or another type of food extruder. The cutting device is configured to couple to an outlet (specifically a die face) of an extruder and includes a blade operatively coupled to a biasing member. The cutting device may include a safety guard to at least partially shield a user from the blade while the cutting device is in use. The blade is arranged to move across the die face to cut the extruded food product in response to the mechanical release of the biasing member. The amount of time needed to charge the biasing member is variable, which allows a user to select the amount of time between blade cuts. A user can thus adjust the length of the extruded food product that is formed using the disclosed cutting device. The charging mechanism of the cutting device also provides fast and powerful blade movement to minimize smearing of food products and resulting in clean cuts of the extruded food product. Currently available cutting devices for food extruders are not adjustable in this manner and do not produce cleanly cut extruded food products.

The food processing device may include programming to facilitate ease of use throughout different food processing sequences. For example, the food processing device may be programmed to carry out a mixing function when certain conditions are met (e.g., the door assembly is detected to be in a closed position). Once a predetermined amount of time has elapsed while a mixing function is performed, the food processing device may then send a cue to a user (e.g., to open the door assembly). The food processing device may then perform a different function (e.g., an extruding function) when certain other conditions are met (e.g., the door assembly is detected to be in an open position and the cutting device and guard are detected to be secured on the extruder outlet). The extruding function may include rotating the auger within the extruder and/or moving the gear assembly such that the accessory attachments guide mixed food ingredients into the feed chute. These programming features may improve user experience while also ensuring user safety during mixing and extruding food processing sequences.

Embodiments of the food processing device and methods of use of this disclosure may include one or more of the following, in any suitable combination.

Embodiments of the food processing device of this disclosure include a base, a mixing bowl mountable on the base, a mixing assembly, an extruder, and a door assembly. The mixing bowl includes a first opening arranged to receive unmixed food items and a second opening arranged to output mixed food items. The mixing assembly is arranged in the mixing bowl to mix the unmixed food items to produce the mixed food items. The extruder is arranged to receive the mixed food items from the second opening via a feed chute. The extruder includes an extrusion chamber, an inlet arranged to align with the second opening of the mixing bowl, an outlet, and an auger configured to rotate within the extrusion chamber to move contents from the inlet to the outlet. The door assembly is arranged to be movable between a first position that serves a barrier between the second opening and the inlet to prevent contents of the mixing bowl from entering the extruder and one or more second positions in which contents of the mixing bowl are enabled to exit the mixing bowl through the second opening and enter the feed chute and then the extruder through the inlet.

In further embodiments, the mixing assembly includes a gear assembly having a central gear, a first gear, and a second gear. The central gear is coupled to a drive shaft and arranged to rotate about a central axis of the mixing bowl in response to rotation of the drive shaft. The first gear is coupled to the central gear and extends radially away from the central axis in a first direction. The first gear is arranged to rotate in response to rotation of the central gear. The first gear is coupled to a first accessory attachment interface configured to receive a detachable first accessory attachment. The second gear is coupled to the central gear and extends radially away from the central axis in a second direction different from the first direction. The second gear is arranged to rotate in response to rotation of the central gear and the second gear is coupled to a second accessory attachment interface configured to receive a detachable second accessory attachment. In select embodiments, the gear assembly also includes a third accessory attachment interface configured to receive a detachable third accessory attachment. In these and other embodiments, the detachable first accessory attachment is a beater, the detachable second accessory attachment is a hook, and the detachable third accessory attachment is a blade.

In further embodiments, the mixing bowl includes a sidewall defining the first opening at a top edge of the sidewall and a mixing cavity therein and the food processing device also includes a lid shaped to fit on the sidewall and cover the first opening. In these and other embodiments, the lid includes one or more apertures sized to permit entry of liquid ingredients into the mixing cavity. In embodiments, the door assembly has a plunger positioned within the feed chute which extends from the second opening and the plunger is configured to pivot within the feed chute between a first position in which the plunger seals the second opening and a second position in which the plunger retracts within the feed chute and the second opening is open to the feed chute to permit entry of the mixed food items into the feed chute. In embodiments, an extrusion die is positioned at the outlet of the extruder to form the mixed food items into a desired shape. In embodiments, the auger has a helical rib that rotates within the extrusion chamber to move the mixed food items from the extruder inlet to the extruder outlet. In these and other embodiments, the helical rib has non-uniform dimensions along a length of the extrusion chamber. In some such embodiments, the helical rib is wound more loosely toward the extruder inlet than the extruder outlet.

Embodiments of a method of forming an extruded food product using a food processing device having a base, a mixing bowl mounted on the base, the mixing bowl having an opening, a mixing assembly configured to mix ingredients within the mixing bowl, an extruder having an inlet and coupled to the base, a conduit between the opening of the bowl and the inlet of the extruder, and a door assembly are also described. The method includes placing one or more food ingredients into the mixing bowl while the door assembly is in a first configuration preventing passage of the one or more food ingredients from the opening of the mixing bowl to the inlet of the extruder via the conduit. The method also includes mixing the one or more food ingredients within the mixing bowl using the mixing assembly while the door assembly is in the first configuration. The method further includes changing the door assembly from the first configuration to a second configuration to enable passage of the one or more food ingredients from the opening of mixing bowl to the inlet of the extruder via the conduit. The method also includes, while the door assembly is in the second configuration, operating the extruder to extrude, from an outlet, the mixed ingredients received from the inlet to form the extruded food product.

In further embodiments, the method also includes changing the door assembly from the second configuration to the first configuration. In these and other embodiments, changing the door assembly from the second configuration to the first configuration causes a plunger mounted within the conduit to contact one or more interior walls of the conduit as the plunger pivots within the conduit and forces food ingredients from the conduit into the mixing bowl. In embodiments, the method also includes attaching one or more accessory attachments to the mixing assembly prior to mixing the ingredients. In these and other embodiments, the method also includes releasing the one or more accessory attachments from the mixing assembly after mixing the ingredients. In embodiments, the method includes covering the mixing bowl with a lid. In some such embodiments, the method also includes adding one or more liquid ingredients to the mixing bowl through one or more apertures formed in the lid. In embodiments, the method also includes operating a cutting device mounted to the outlet of the extruder to cut the extruded food product released from the extruder at regular time intervals. These and other embodiments, the extruded food product is pasta.

Embodiments of a food processing device of this disclosure include a base having a rotational drive port, a mixing bowl arranged to detachably connect to the base, a door assembly, and an extruder. The mixing bowl includes an opening and a drive coupler arranged to engage with the rotational drive port. The door assembly includes a conduit extending from the opening and a plunger configured to be matingly received within the opening of the mixing bowl. The plunger is configured to pivot between a first position in which the plunger is within the opening and a second position in which the plunger retracts within the conduit. The extruder includes an extrusion chamber having an inlet and an outlet and the inlet is positioned to receive one or more food ingredients from the conduit. The extruder also includes an auger having a helical rib configured to rotate within the extrusion chamber to bring the one or more food ingredients from the inlet to the outlet and a die positioned at the outlet to form the one or more food ingredients into a desired shape.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein:

FIG. 2 shows a cross-sectional view of the food processing device of FIG. 1 according to some embodiments;

FIGS. 3A and 3B illustrate cross-sectional views of the food processing device of FIG. 1, according to some embodiments, with FIG. 3A showing the door assembly in a closed position and FIG. 3B showing the door assembly in an open position;

FIG. 5 illustrates a method of using the food processing device of FIG. 1, in accordance with some embodiments;

5

Figures 6A, 6B, 6C:
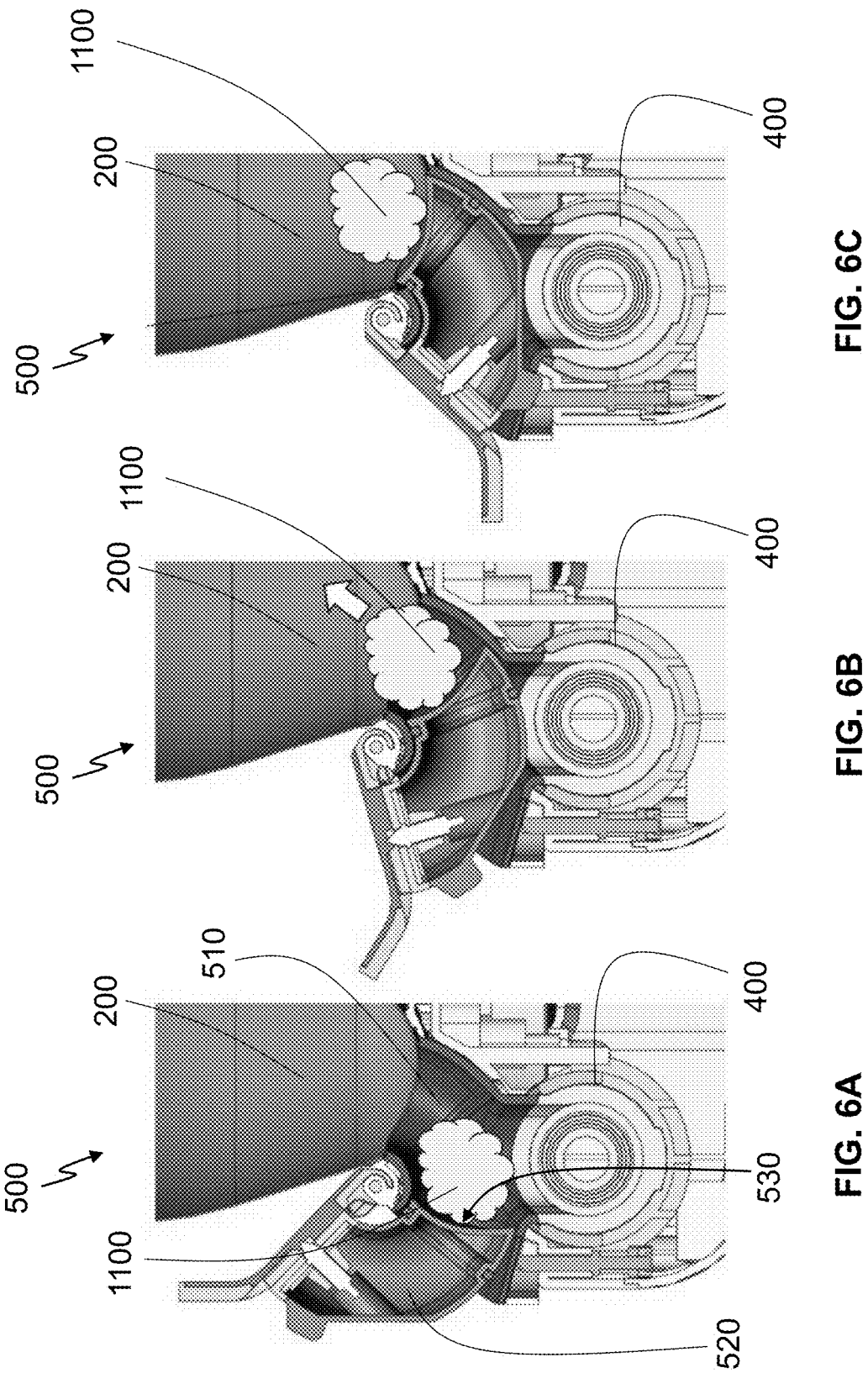
Figures 7A, 7B:
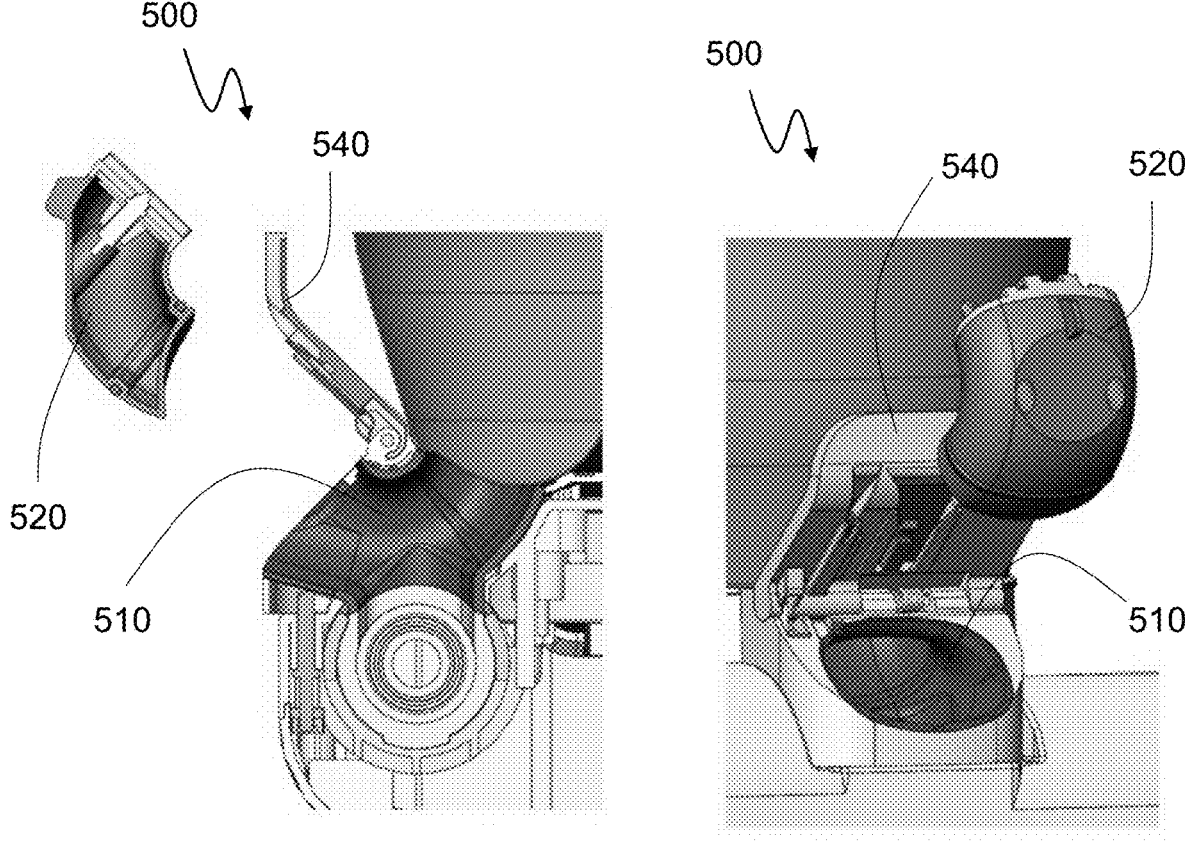
Figure 11:
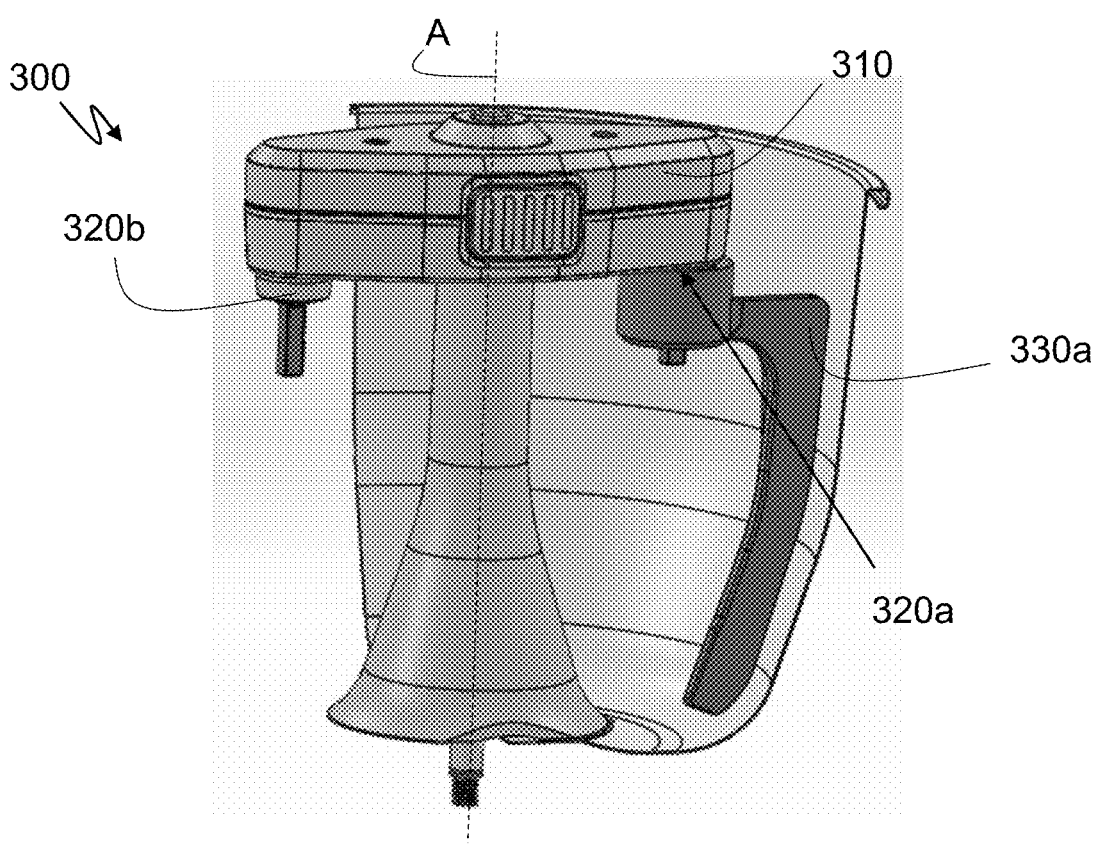
Figure 12:
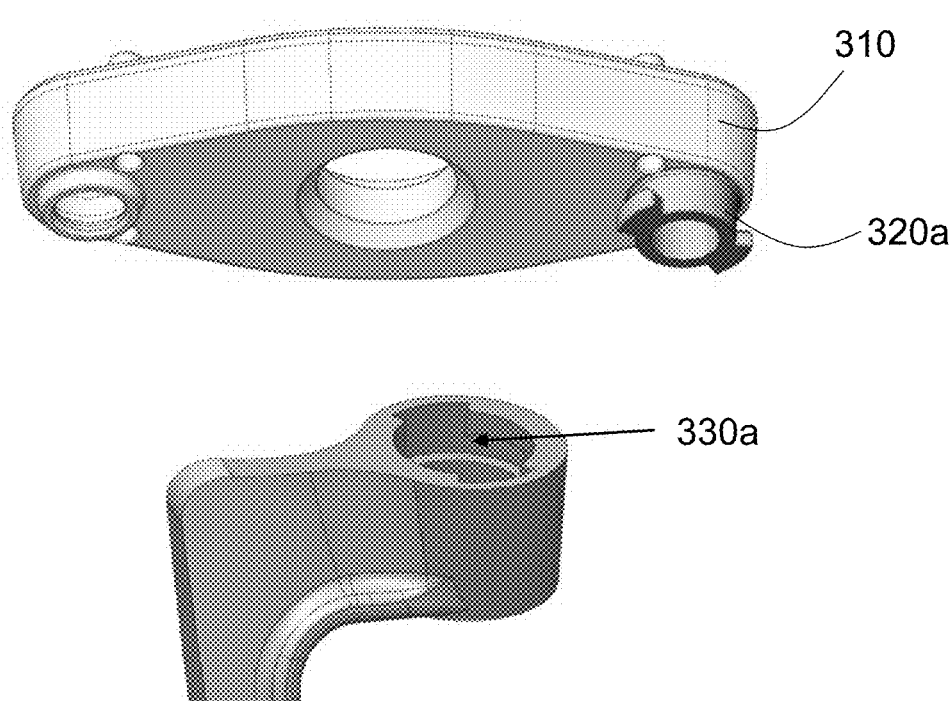
Figures 14A, 14B, 14C:
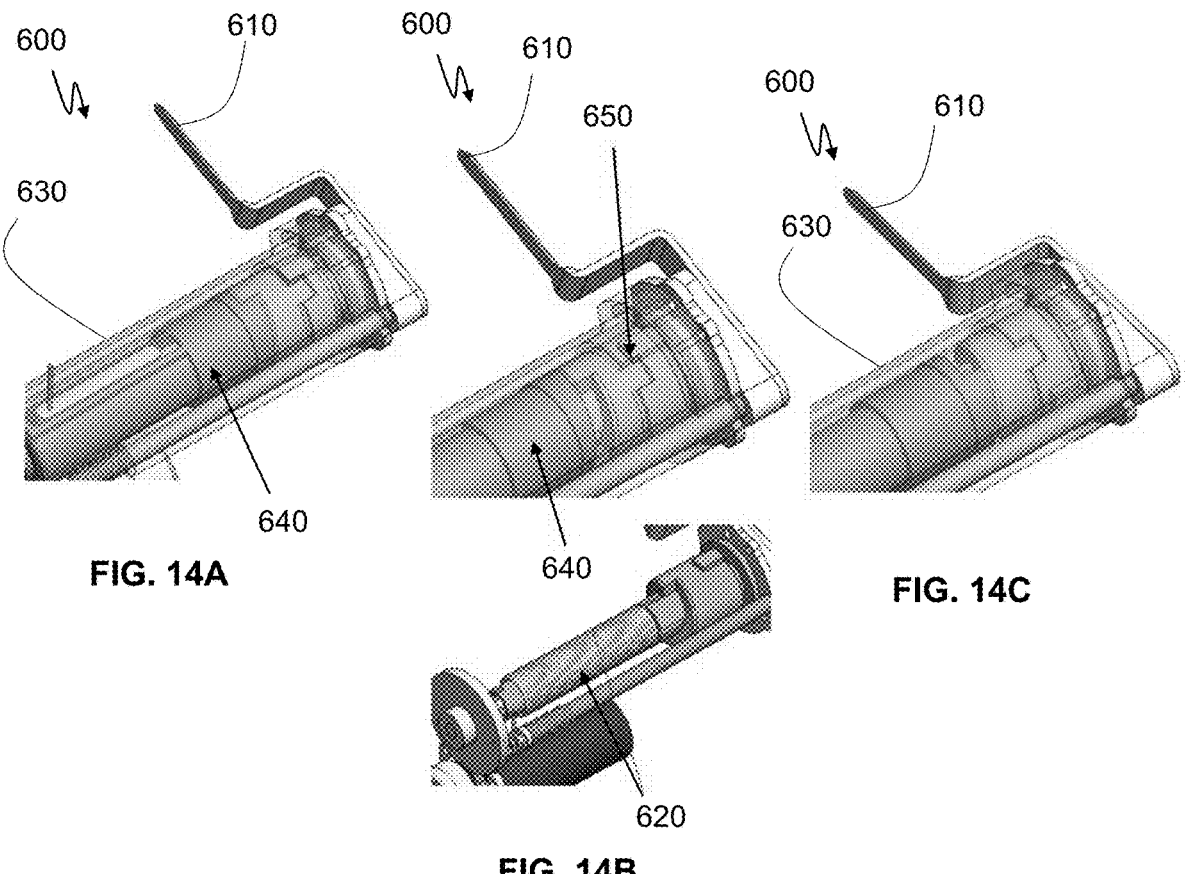
Figure 17:
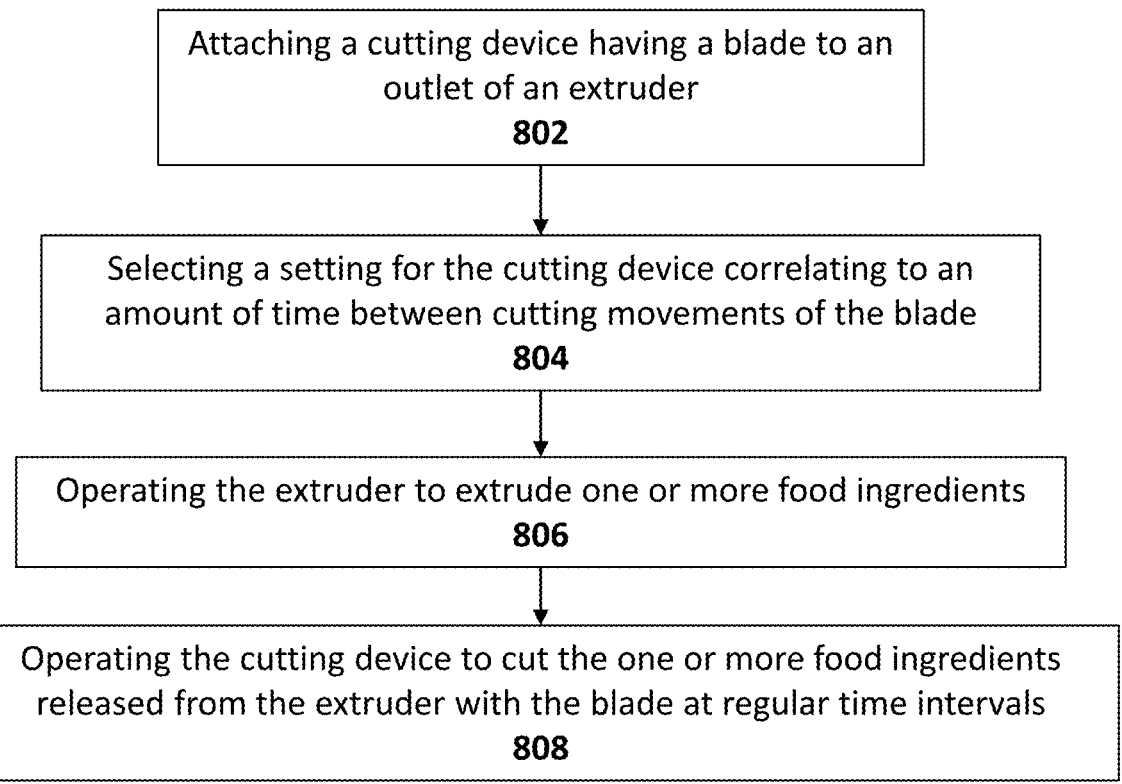
Figure 18:
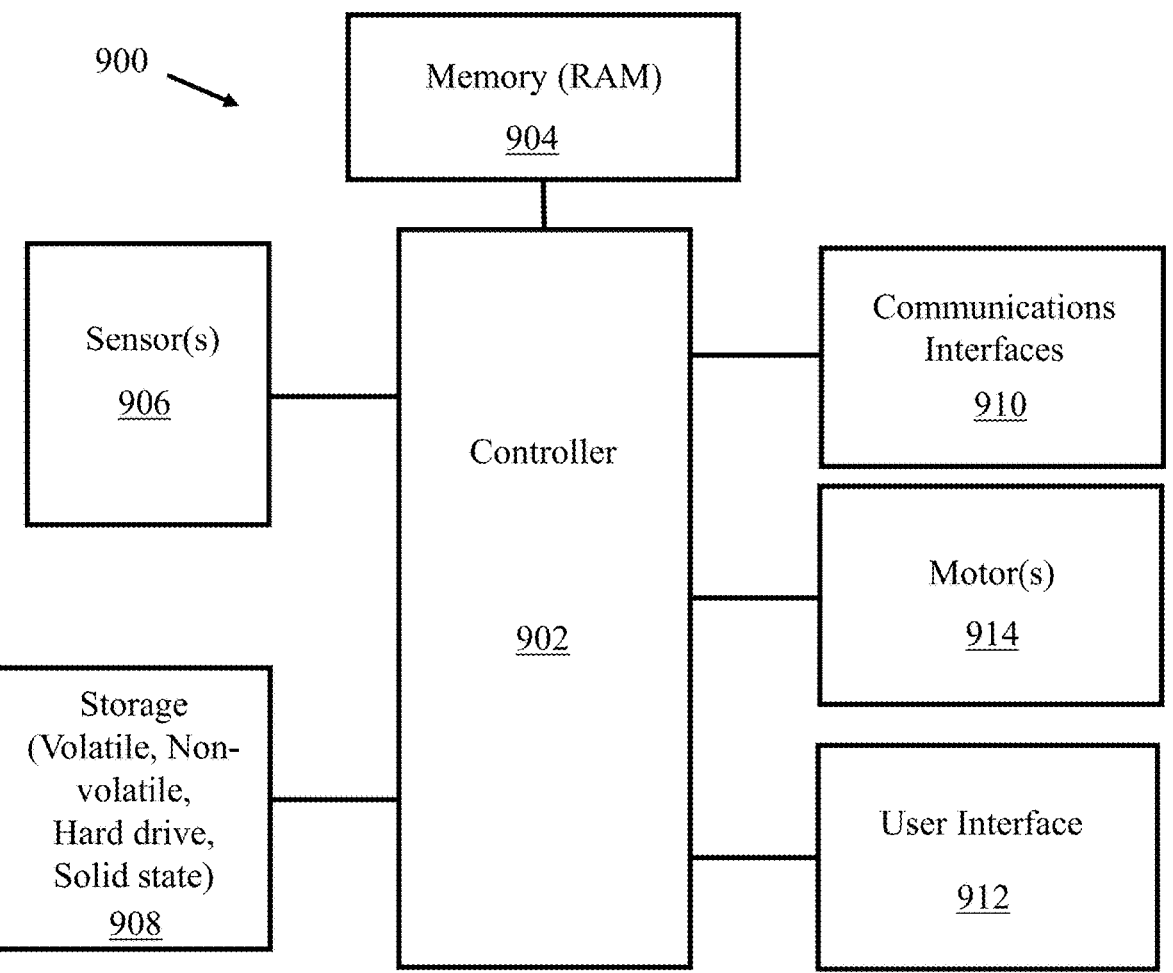

FIGS. 6A-6C illustrate a door assembly moving from between an open position and a closed position, in accordance with some embodiments;

FIGS. 7A and 7B illustrate a door assembly in which the plunger has been detached from the feed chute, in accordance with some embodiments;

FIGS. 8A-8D illustrate a door assembly having an optional lock button according to some embodiments;

FIGS. 9A-9D illustrate a door assembly having an optional spring according to some embodiments;

FIG. 10 illustrates a method of using a door assembly according to some embodiments;

FIG. 11 shows a perspective view of a gear assembly according to some embodiments;

FIG. 12 shows an exploded view of the gear assembly of FIG. 11, according to some embodiments;

FIG. 13 shows a method of using a gear assembly, in accordance with some embodiments;

FIGS. 14A-14C show a cutting device configured in accordance with some embodiments;

FIGS. 15A and 15B show a guard for a cutting device;

FIG. 16 shows an exploded view of a cutting device with a guard mounted to an extruder, according to some embodiments;

FIG. 17 illustrates a method of using a cutting device according to some embodiments;

FIG. 18 shows a block diagram of an electronic control system for a food processor according to some embodiments; and FIG. 19 illustrates a method of processing food items using a food processor, according to some embodiments.

DETAILED DESCRIPTION

In the following description, like components have the same reference numerals, regardless of different illustrated embodiments. To illustrate embodiments clearly and concisely, the drawings may not necessarily reflect appropriate scale and may have certain structures shown in somewhat schematic form. The disclosure may describe and/or illustrate structures in one embodiment, and in the same way or in a similar way in one or more other embodiments, and/or combined with or instead of the structures of the other embodiments.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the food processing device in any manner.

The subject disclosure relates to multiple components and methods. The components described herein may be incorporated into a single device or present within distinct devices. Similarly, the methods described herein may be carried out by single device or multiple devices.

Mixing Bowl with Door Assembly and Extruder

6

Figure 1:
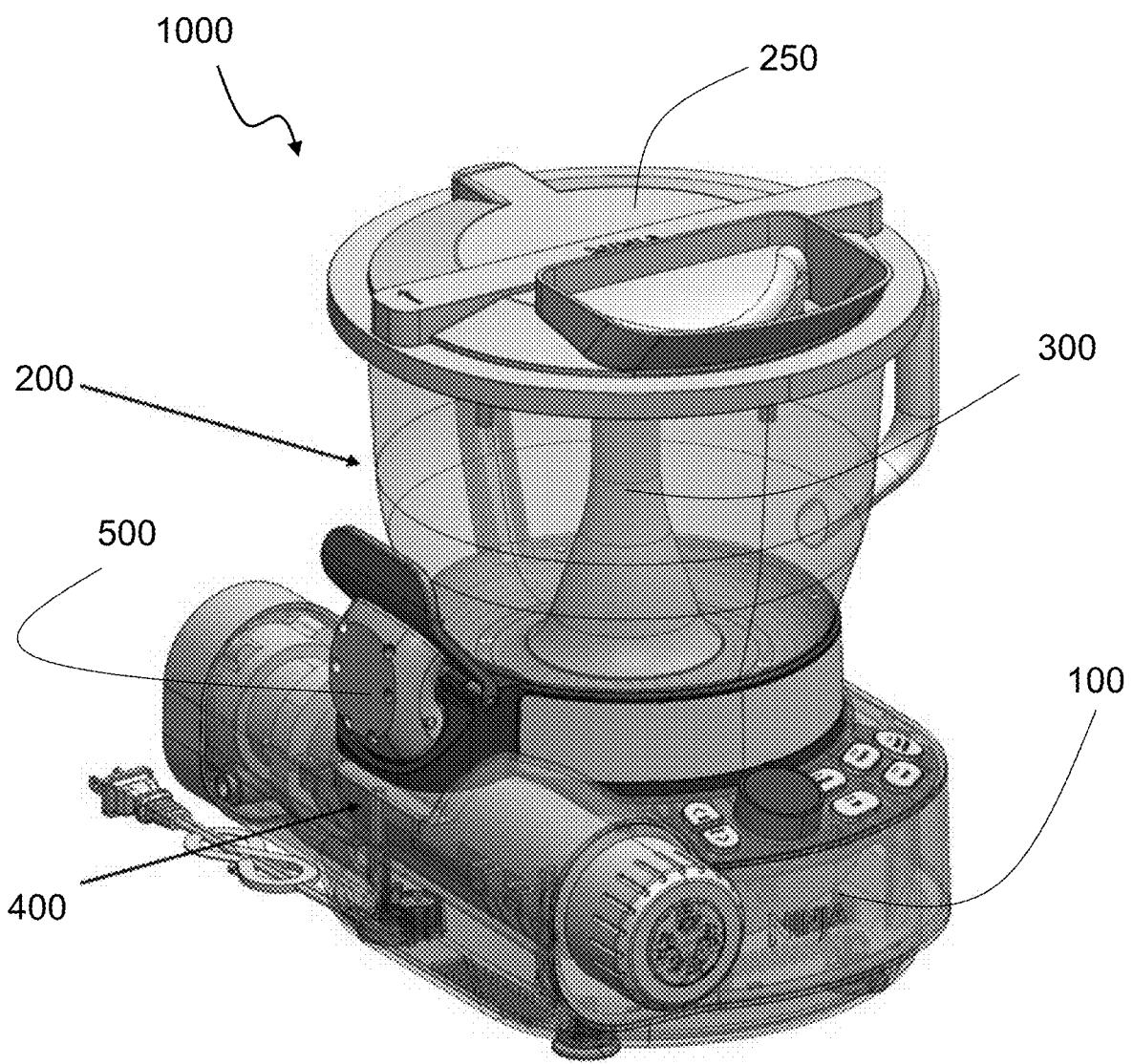
FIG. 1 shows a food processing device with a mixing bowl and an extruder linked by a door assembly, according to some embodiments of this disclosure.

FIG. 1 shows a perspective view of a food processing device 1000 according to an illustrative embodiment of the present disclosure. As used herein, the term "food processing device" is understood to mean a device capable of performing any type of food processing function, such as mixing, blending, beating, whipping, scraping, chopping, slicing, cutting, dicing, kneading, and/or folding. The food processing device 1000 includes a mixing bowl 200 with stand mixing functionality in addition to an extruder 400 couplable to the mixing bowl 200 to extrude pasta or other food products. As will be apparent to those skilled in the art upon consideration of the subject disclosure, the presently disclosed food processing device 1000 may advantageously allow a user to form dough in the mixing bowl 200 and then extrude the mixed ingredients straight from the mixing bowl 200 through an integrated extruder 400. The food processing device 1000 thus has both mixing and extruding capabilities, allowing it to operate as both a stand mixer and a pasta maker. The mixing bowl 200 and extruder 400 are linked via a door assembly 500, also referred to as a "trap door" in some implementations, having a feed chute (alternately referred to at times herein as a "conduit"). To move between mixing and extruding functions, a user can change the configuration of a door assembly 500 mounted to the mixing bowl 200 to either prohibit or allow contents of the mixing bowl 200 to enter the extruder 400 via the feed chute. The "open" position of the door assembly 500 will be used to refer to the position in which contents are permitted to flow from the mixing bowl 200 to the extruder 400. The "closed" position of the door assembly 500 will be used to refer to the position in which contents from the mixing bowl 200 are restricted from entering the extruder 400.

The food processing device 1000 may include a base 100 and a mixing bowl 200 mountable on the base 100. A gear assembly 300 (discussed in additional detail below) may be arranged within the mixing bowl 200 to mix unmixed food items in the mixing bowl 200 to produce mixed food items. The mixing bowl 200 includes a first opening arranged to receive unmixed food items and a second opening arranged to output mixed food items. The first opening of the mixing bowl 200 may be present at or near the top of the mixing bowl 200. In FIG. 1, the mixing bowl 200 includes a sidewall that extends around a circumference of the mixing bowl 200, defining a mixing cavity therein. The sidewall of the mixing bowl 200 is open at the top to define a first opening. The sidewall may also include a second opening leading to the door assembly 500 (specifically, the feed chute 510). In some embodiments, the food processing device 1000 may include a lid 250, as shown in FIG. 1. The lid 250 may be sized to fit over the first opening of the mixing bowl 200. The lid 250 may include one or more apertures sized to permit entry of liquid ingredients into the mixing cavity within the mixing bowl 200.

As shown in FIG. 1, the food processing device 1000 may also include an extruder 400 arranged to receive one or more (mixed or unmixed) food ingredients from the mixing bowl 200. The extruder 400 includes an extrusion chamber, an inlet, an outlet, and an auger configured to rotate within the extrusion chamber to move contents from the inlet to the outlet. The inlet of the extruder may be arranged to align with the second opening of the mixing bowl 200.

A door assembly 500 may be positioned between the mixing bowl 200 and the extruder 400, as illustrated in FIG. 1. The door assembly 500 includes a feed chute 510 that extends from an opening in the mixing bowl 200 (e.g., the second opening) to an inlet of the extruder 400. The door assembly 500 may be arranged to be moveable between a first position and one or more second positions. In the first ("closed") position, the door assembly 500 blocks contents from the mixing bowl 200 from entering the extruder 400, and in the one or more second ("open") positions, contents from the mixing bowl 200 are permitted to enter the extruder 400 via the feed chute 510. Additional details regarding the door assembly 500 are discussed below with respect to FIGS. 6A-9D.

FIG. 2 illustrates a cross-sectional view of the food processing device of FIG. 1, showing the interior of the feed chute 510 and the extruder 400. The extruder 400 is arranged to receive one or more food ingredients from the feed chute 510. The extruder 400 includes an extrusion chamber, an inlet, an outlet, and an auger 410 configured to rotate within the extrusion chamber to move contents from the inlet to the outlet. The extruder 400 may also include a motor to drive rotation of the auger 410. The auger 410 has a helical rib that rotates within the extrusion chamber as the auger 410 rotates to move the one or more food ingredients from the inlet to the outlet of the extruder 400. The helical rib may have non-uniform dimensions along a length of the extrusion changer. For example, in some embodiments, the helical rib may wound more loosely toward the extruder inlet than the extruder outlet. If desired, the extruder 400 may also include an extrusion die positioned at the outlet of the extruder 400 to form extruded foods exiting the extruder 400 into a desired shape. In select embodiments, the extrusion die may be a pasta-forming die. For safety, the extruder may include one or more interlocks to prevent movement of the auger 410 unless an extrusion die is attached to the outlet of the extruder 400.

In FIG. 2 the door assembly is in an open position. The door assembly 500 may include a plunger 520 positioned within the feed chute 510, as shown in FIG. 2. When moving between closed and open positions, the plunger 520 pivots within the feed chute 510. FIG. 3A shows the interior of the feed chute 510 when the door assembly 500 is in a closed position and FIG. 3B shows the interior of the feed chute 510 with the door assembly 500 in an open position. When the door assembly 500 is in the closed position, the mixing bowl 200 may operate as a standard mixing bowl. When the door assembly 500 is in an open position, the mixing bowl 200 acts as a feeder to the extruder 400.

Figure 4:
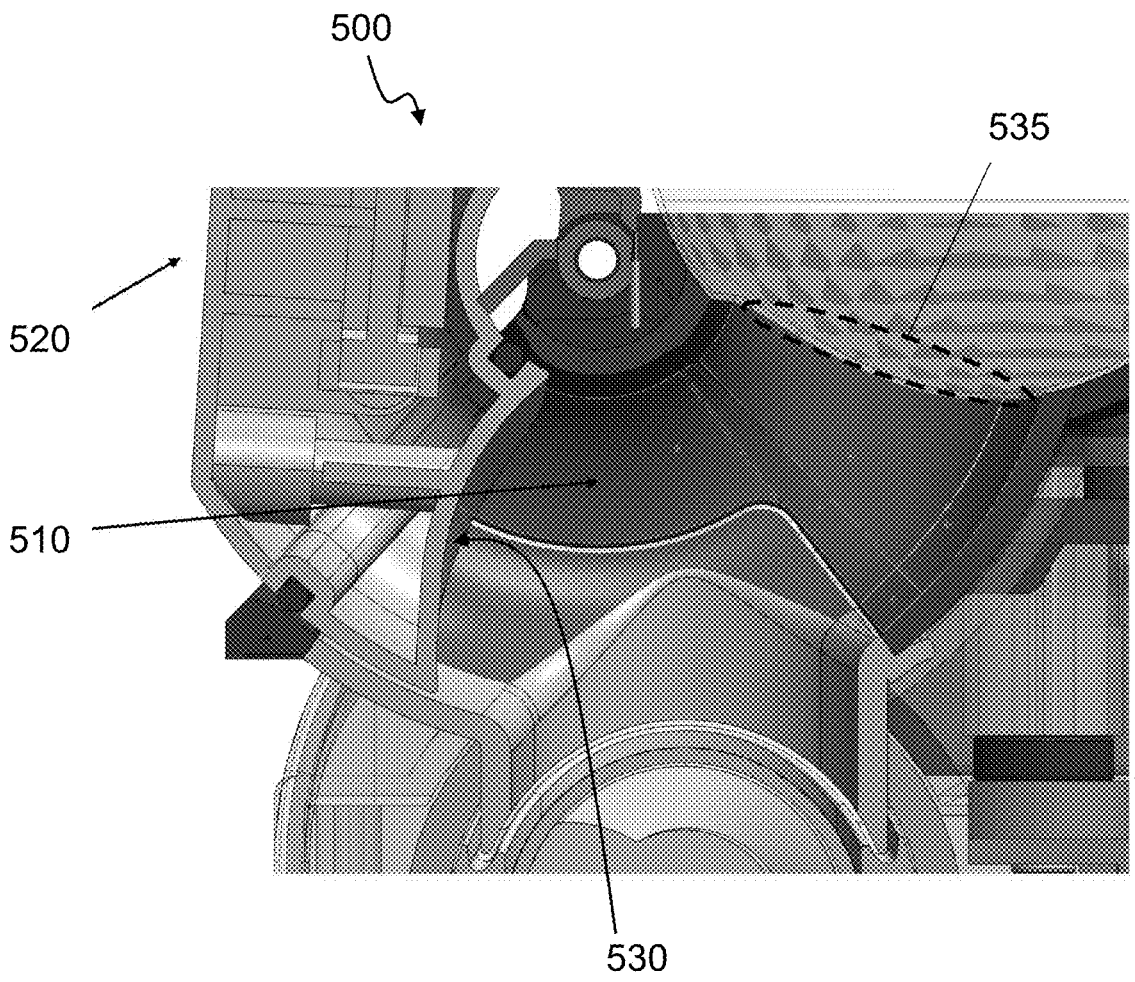
FIG. 4 shows a cross-sectional view of the door assembly in an open position, according to some embodiments.

In some embodiments, the feed chute 510 has a relatively uniform cross-section along its length. The plunger 520 may include a face 530 sized to occupy a cross-section of the feed chute 510 to create a seal as the plunger 520 travels through the feed chute 510. In some embodiments, the plunger 520 can prevent the feed chute 510 from becoming clogged. For example, as the plunger 520 moves through the feed chute 510 from an open position (as shown in FIG. 3B and FIG. 4) to a closed position (as shown in FIG. 3A), the plunger 520 and/or the face 530 of the plunger 520 pushes any remaining ingredients left within the feed chute 510 into the mixing bowl 200. When the door assembly 500 is in the closed position, as shown in FIG. 3A, the inner surface 530 of the plunger 520 creates a seal with the sidewall of an opening 535 in the mixing bowl 200. The inner surface 530 of the plunger 520 may be shaped to complement the curvature of the mixing bowl 200 when the door assembly 500 is in a closed position.

FIG. 5 illustrates a method 150 of forming an extruded food product using the food processing device 1000. The food processing device 1000 may include a base 100, a mixing bowl 200 having an opening, a mixing assembly (e.g., gear assembly 300) configured to mix ingredients within the mixing bowl, an extruder 400 having an inlet and coupled to the base, and a conduit (e.g., feed chute 510) between the opening of the bowl and the inlet of the extruder and a door assembly 500.

As shown in FIG. 5, the method 150 includes placing one or more food ingredients into the mixing bowl while the door assembly is in a first configuration preventing passage of the one or more food ingredients from the opening of the mixing bowl to the inlet of the extruder via the conduit (152).

Method 150 continues with mixing the one or more food ingredients within the mixing bowl using the mixing assembly while the door assembly is in the first configuration (154).

Method 150 also includes changing the door assembly from the first configuration to a second configuration to enable passage of the one or more food ingredients from the opening of mixing bowl to the inlet of the extruder via the conduit (156).

Method 150 further includes, while the door assembly is in the second configuration, operating the extruder to extrude, from an outlet, the mixed ingredients received from the inlet to form an extruded food product (158).

Method 150 may optionally include changing the door assembly from the second configuration to the first configuration. In some such embodiments, changing the door assembly from the second configuration to the first configuration causes a plunger mounted within the conduit to contact one or more interior walls of the conduit as the plunger pivots within the conduit and forces food ingredients from the conduit into the mixing bowl.

Method 150 may also include attaching one or more accessory attachments to the mixing assembly prior to mixing the ingredients. In some such embodiments, the method 150 may also include releasing the one or more accessory attachments from the mixing assembly after mixing the ingredients.

Method 150 may also optionally include covering the mixing bowl with a lid. In some embodiments, method 150 further includes adding one or more liquid ingredients to the mixing bowl through one or more apertures formed in the lid.

In select embodiments, method 150 further includes operating a cutting device mounted to the outlet of the extruder to cut the extruded food product released from the extruder at regular time intervals. In method 150, the extruded food product may be pasta.

Door Assembly

In another aspect, the subject disclosure is directed to a door assembly 500 for a mixing bowl 200 or other type of food processing device. The door assembly 500 described herein may be used in connection with any of the components of food processing device 1000 discussed herein (e.g., mixing bowl 200 and/or extruder 400) or another food processing device. FIGS. 6A-6C illustrate a door assembly 500 configured in accordance with some embodiments of the subject disclosure. FIG. 6A shows the door assembly 500 in an open position in which contents of the mixing bowl 200 are open to an extruder 400 via a feed chute 510. FIG. 6C shows the door assembly 500 in a closed position in which contents of the mixing bowl 200 are prevented from entering the feed chute 510 and the extruder 400. FIG. 6B shows the door assembly 500 between open and closed positions. The feed chute 510 may be positioned in any feasible location on the mixing bowl 200. For example, in some embodiments, the feed chute 510 may extend from an opening in a sidewall of the mixing bowl 200.

As shown in FIGS. 6A-6C, the door assembly 500 includes a plunger 520 having a face 530. The plunger 520 is configured to pivot between a first (closed) position and a second (open) position within the feed chute 510. In the closed position (shown in FIG. 6C), the face 530 of the plunger 520 is flush with an interior surface of the mixing bowl 200. When in the closed position, the face 530 of the plunger 520 may form a water-tight seal with the mixing bowl 200. In the open position (shown in FIG. 6A), the face 530 of the plunger 520 retracts into the feed chute 510 and permits food ingredients 1100 from the mixing bowl 200 to enter and flow through the feed chute 510.

As shown in FIGS. 6A-6C, the configuration of the door assembly 500 can force all food ingredients 1100 that enter the feed chute 510 back into the mixing bowl 200 when the plunger 520 is moved from the open position to the closed position. In some embodiments, the plunger 520 may contact one or more interior walls of the feed chute 510 as it moves from the open position (FIG. 6A) to the closed position (FIG. 6C) to force food ingredients 1100 from the feed chute 510 into the mixing bowl 200. The face 530 of the plunger 520 may be curved to complete the interior surface of the mixing bowl 200 when the plunger 520 is in the closed position. The feed chute 510 may include one or more curved sidewalls, in some embodiments. In these and other embodiments, the plunger 520 may be arranged to pivot around a pivot axis, which may be horizontal.

When the door assembly 500 is in the closed position, food can be mixed or processed in the mixing bowl 200. The auger of the extruder 400 may be prevented from being activated while the door assembly 500 is in the closed position. When the door assembly 500 is in the open position, food ingredients 1100 within the mixing bowl 200 may be permitted to enter the feed chute 510. In select embodiments, beaters or blades on a gear assembly 300 rotating within the mixing bowl 200 may force dough or other mixed food ingredients into the feed chute 510 while the door assembly 500 is in the open position.

The door assembly 500 may be configured to selectively engage features of an attached extruder 400 to control operation of the extruder 400 for safety and/or operational efficiency. For example, one or more interlocks may be used to detect open and closed positions of the door assembly 500. In select embodiments, the door assembly 500 may include a rib or other protrusion that contacts a microswitch to control operation of the extruder 400 (for example, to only allow activation of the extruder 400 when the door assembly 500 is in the open position).

Components of the door assembly 500 may be detachable to allow for easy cleaning. For example, as shown in FIGS. 7A and 7B, the plunger 520 may be removable from the feed chute 510 in some embodiments. The door assembly 500 may be configured such that when the plunger 520 is removed from the feed chute 510, the auger 410 of the extruder 400 may not be turned on. This safety feature can prevent a user from contacting the auger 410 while in use. When the plunger 520 is coupled to the door assembly 500, a microswitch is activated to permit operation of the auger 410 of the extruder 400 when the door assembly 500 is in the open position.

The door assembly 500 may also include a handle 540 arranged to control movement of the plunger 520 through the feed chute 510 between the open position and the closed position. The handle 540 may be accessible to a user from an outside surface of the door assembly 500.

The door assembly 500 may also include a lock button 550, as shown in FIGS. 8A-8D. FIG. 8A shows the door assembly 500 in a closed and locked position. FIG. 8B shows the door assembly 500 in an open an unlocked position. FIG. 8C shows a cross-sectional view of the closed and locked door assembly of FIG. 8A, taken along Section A. FIG. 8D shows a cross-sectional view of the open and unlocked door assembly of FIG. 8B, taken along Section A. Lock button 550 permits a user to selectively lock and unlock the door assembly 500.

Figures 9A, 9B, 9C, 9D:
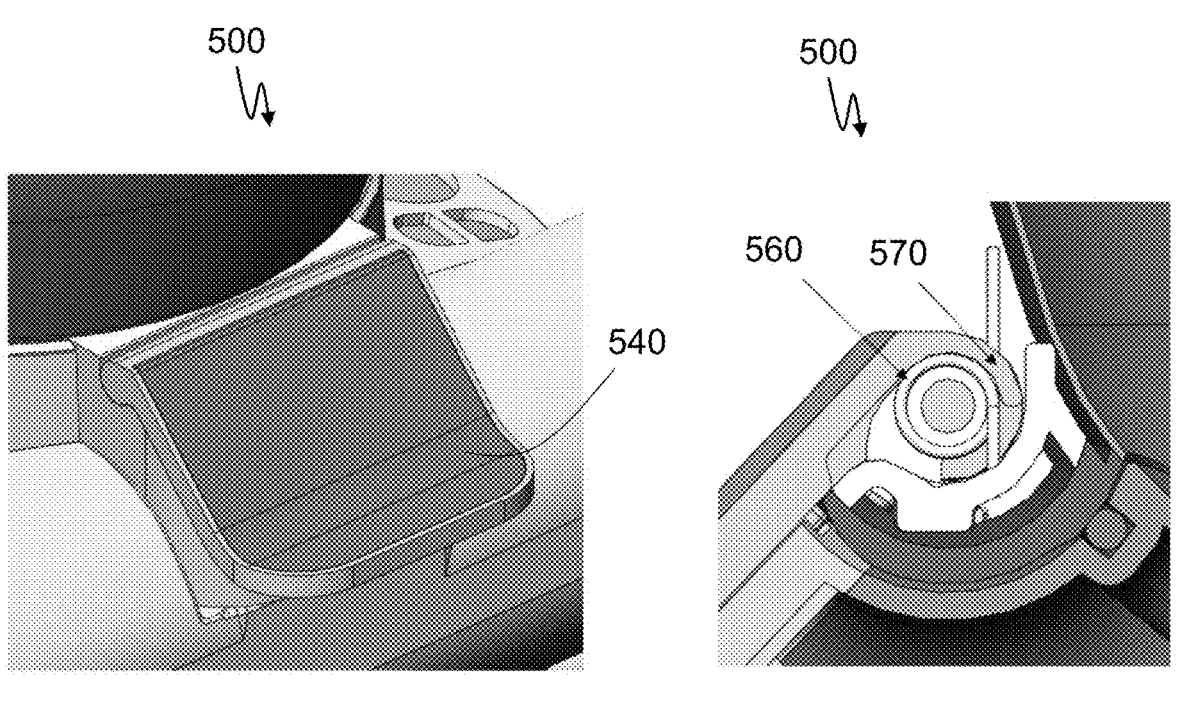

The door assembly 500 may also include a spring 560 to facilitate movement from the closed position to the open position in some embodiments. FIGS. 9A-9D illustrate features of the spring 560. FIG. 9A shows the door assembly 500 in a closed and locked position. When the door assembly 500 is unlocked, the spring 560 moves the plunger 520 within the feed chute 510 to configure the door assembly 500 into an open position. FIGS. 9B-9D illustrate cross-sectional views of the spring 560, which may include an optional shroud 570 to prevent a user from seeing the spring 560. The shroud 570 may fit within a hinge and, as shown in FIG. 9D, the hinge may include a recessed region 580 to accommodate the shroud 570.

FIG. 10 illustrates a method 700 of operating a door assembly configured in accordance with the subject disclosure (e.g., door assembly 500). Method 700 begins with positioning a plunger pivotally mounted within a feed chute in a first position (702). In the first position, a face of the plunger seals an opening of the mixing bowl, which extends through at least one wall of the mixing bowl.

Method 700 continues with mixing one or more food ingredients within the mixing bowl (704).

Method 700 continues with moving the plunger to a second position in which the plunger retracts into the feed chute (706). When in the second position, the one or more food ingredients may be permitted to enter the feed chute via the opening.

Method 700 may also optionally include extruding the one or more food ingredients using an extruder positioned to receive the one or more food ingredients from the feed chute. In some embodiments, method 700 also includes attaching an extrusion die to the extruder prior to extruding the one or more food ingredients. In select embodiments, the extrusion die may be shaped to form pasta. Method 700 may also include moving the plunger from the second position to the first position to seal the feed chute from the mixing bowl. In some such embodiments, moving the plunger from the second position to the first position causes the plunger to contact one or more interior walls of the feed chute as it pivots within the feed chute and force food ingredients from the feed chute into the mixing bowl.

In method 700, the plunger may pivot around a horizontal axis when moved between the first position and the second position. In some embodiments, the plunger may be moved from the first position to the second position manually by a user using a handle connected to the plunger. In other embodiments, however, movement of the plunger between the first position and the second position may be controlled electronically.

Gear Assembly

FIG. 11 illustrates a gear assembly 300 configured to mix food ingredients within a mixing cavity of a mixing bowl (e.g., mixing bowl 200). The gear assembly 300 is connectable to a base (e.g., the base 100 described herein). The base has a drive system that drives a central coupling on the base which connects to a shaft that runs up the center of a mixing bowl. The gear assembly 300 is thus bottom-driven by the base. Driving the gear assembly 300 from below rather than above, as is commonly done in conventional stand mixers, gives the user improved access to the mixing bowl. Additionally, as discussed below, the disclosed gear assembly 300 utilizes a gear hub configuration that provides outputs that are either at parity to or that exceed top-driven mixers. The accessory attachment mechanisms for the disclosed gear assembly 300 are also superior to those of conventional mixers, providing improved user experiences.

The gear assembly 300 may include a drive shaft configured to couple with a drive coupler of the mixing bowl and rotate about a central axis (A) within the mixing bowl. The gear assembly 300 includes a gear assembly housing 310 spaced away from the drive coupler and configured to rotate about the central axis (A). The gear assembly housing 310 includes a central gear coupled to the drive shaft and arranged to rotate about the central axis (A) in response to rotation of the drive shaft. The gear assembly 300 may be bottom-driven and a rotational movement of the gear assembly housing 310 may be driven by the drive coupler positioned below the gear assembly housing 310 via the drive shaft.

The gear assembly housing 310 includes a first gear coupled to the central gear and extending radially away from the central axis (A) in a first direction. The first gear may be arranged to rotate in response to rotation of the central gear. The first gear may be coupled to a first accessory attachment interface 320a configured to receive a detachable first accessory attachment 330a.

The gear assembly housing 310 further includes a second gear coupled to the central gear and extending radially away from the central axis (A) in a second direction different from the first direction. The second gear may be arranged to rotate in response to rotation of the central gear. The second gear may be coupled to a second accessory attachment interface 320b configured to receive a detachable second accessory attachment.

In some embodiments, the first accessory attachment interface 320a and the second accessory attachment interface 320b may be located on a bottom surface of the gear assembly housing 310, as shown in FIG. 11. The first accessory attachment interface 320a and the second accessory attachment interface 320b may include bayoneting features to easily couple and decouple accessory attachments. In these and other embodiments, the gear assembly 300 also includes one or more release buttons to uncouple the detachable first accessory attachment and/or the detachable second accessory attachment from the gear assembly housing 310. If present, the release button(s) may be positioned on a top surface of the gear assembly housing 310 to allow a user to remove the accessories without having to touch a potentially messy interface (the bottom surface of the gear assembly housing 310). In some embodiments, the gear assembly housing 310 may be dishwasher safe or may have wipe clean surfaces.

The gear assembly 300 is configured to allow the gear assembly housing 310 to rotate around the central axis (A). In some embodiments, the gear assembly housing 310 rotates clockwise around central axis (A). The first gear and the second gear are configured to allow the detachable first accessory attachment 330a and the detachable second accessory attachment 330b to rotate with respect to the gear assembly housing 310. In some embodiments, the detachable first accessory attachment 330a and the detachable second accessory attachment 330b are each arranged to rotate clockwise with respect to the gear assembly housing 310. Thus, in some embodiments, there may be simultaneous rotation of the gear assembly housing 310 about its central axis (A) and rotation of each mounted accessory attachment around its own axis.

The first gear and second gear may be geared in any desired configuration. For example, the first gear may be configured to rotate the detachable first accessory attachment 330a within the gear assembly housing 310 at a first rate, and the second gear may be configured to rotate the second detachable accessory attachment 330b within the gear assembly housing 310 at a second rate, and the first rate may be unequal to the second rate. The ratio between these two rotation speeds may be tuned to enable optimal whisking and beating outputs for the desired food ingredients. Testing indicates that if the ratio is too high, ingredients are just moved around the mixing bowl and are not sufficiently processed, whereas if the ratio is too low, processing of the ingredients is significantly delayed. In some embodiments, the gear assembly 300 may have a non-integer ratio to ensure that all accessory attachments do not hit the same points on the mixing bowl with every rotation, thereby providing consistent mixing of all ingredients within the mixing cavity.

The gear assembly housing 310 may also include a third accessory attachment interface configured to receive a detachable third accessory attachment. If present, the detachable third accessory attachment may be configured to either remain stationary with respect to the gear assembly housing 310 or to rotate with respect to the gear assembly housing 310. If the detachable third accessory attachment is arranged to rotate, rotation of the detachable third accessory attachment may be driven by a third gear coupled to the central gear and extending radially away from the central axis (A) in a third direction (different from the first direction and the second direction), and the third gear may be arranged to rotate in response to rotation of the central gear. In select embodiments, the detachable third accessory attachment is mounted to the gear assembly housing 310 in a fixed manner such that rotational movement of the detachable third accessory attachment with respect to the gear assembly housing 310 is prohibited. In embodiments in which the detachable third accessory attachment is stationary within the gear assembly housing 310, the detachable third accessory attachment may be a dough scraper or a blade. In some such embodiments, the detachable first accessory attachment may be a beater and the detachable second accessory attachment may be a dough hook. This particular arrangement of attachments allows dough to be folded successfully while the dough hook kneads the dough. No other known instrumentation permits simultaneous dough folding and kneading.

FIG. 13 illustrates a method 750 of using a gear assembly configured in accordance with the present disclosure. It should be understood that method 750 may involve the use of the gear assembly 300 and/or the mixing bowl 200 described herein. Method 750 includes attaching a gear assembly to a drive shaft mounted on a drive coupler secured within a bottom section of a mixing bowl (752). In some embodiments, the drive shaft and the gear assembly may be arranged to rotate around a central axis within the mixing bowl.

Method 750 continues with mounting one or more accessories to a gear assembly housing of the gear assembly (754). Method 750 may also optionally include coupling the mixing bowl to a base such that the drive coupler is operatively connected to a drive port within the base.

Method 750 also includes adding one or more food ingredients to the mixing bowl (756). The one or more food ingredients may include both liquids and solids in some embodiments.

Method 750 further includes operating the gear assembly such that the gear assembly housing rotates within the mixing bowl and the one or more accessories mounted to the gear assembly housing mix the one or more food ingredients in the mixing bowl as the gear assembly housing rotates (758). In some embodiments, method 750 also includes selecting an operational mode of the gear assembly to carry out a mixing and/or an extruding function.

In some embodiments, method 750 also includes detaching the one or more accessories from the gear assembly housing. In these and other embodiments, method 750 includes mounting at least two accessories to the gear assembly housing. In some such embodiments, the at least two accessories rotate within the gear assembly housing at different rates during operation of the gear assembly.

Method 750 may also include mounting a first accessory, a second accessory, and a third accessory to the gear assembly housing in some embodiments. In some such embodiments, during operation of the gear assembly, the first accessory and the second accessory rotate with respect to the gear assembly housing and the third accessory remains stationary with respect to the gear assembly housing. In these and other embodiments the first accessory may be a beater, the second accessory may be a dough hook, and the third accessory may be a scraper or a blade.

In some implementations, food processing device 1000 is configure with a top-down gear assembly where the base 100 includes an upper section positioned above and extendable over mixing bowl 200. In such implementations, one or more accessories can be attached to the top-down gear assembly and driven to enable mixing and/or other food processing operations. In such a configuration, an opening such as opening 540 may be positioned centrally at the bottom of mixing bowl 200 while an extruder such as extruder 400 may also aligned centrally below the opening to receive food items from mixing bowl 200 when opening 540 is open. A door assembly may be included to enable opening and closing of opening 540. In such a configuration, the door assembly may be configured to slide or rotate laterally toward or away from the opening to close or open the opening respectively.

Cutting Device

FIGS. 14A-14C illustrate a cutting device 600. The cutting device 600 may be used in connection with any of the componentry described herein or with other types of food processing devices. For example, in some embodiments, the cutting device 600 may be used with extruder 400 and/or as part of food processing device 1000.

The cutting device 600 is configured to couple to the outlet of an extruder 400. The cutting device 600 includes a blade 610 operatively coupled to a biasing member 620. The cutting device 600 also includes a motor and a charging chamber 630 having a charging member 640 arranged to be rotated by the motor and a release feature positioned on the charging member 640. The motor drives forward movement of the charging member 640 within the charging chamber 630 until the release feature reaches a release point 650 within the charging chamber 630. At the release point 650 the biasing member 620 is mechanically released to drive movement of the blade 610. The blade 610 is arranged to move in at least a first direction in response to the mechanical release of the biasing member 620. The biasing member

620 may be a spring or another type of resilient member capable of storing and releasing mechanical energy.

The blade 610 has two cutting surfaces facing opposing directions. The blade 610 may be arranged to cut extrudate from an extruder outlet from left to right and from right to left. In other embodiments, however, the blade 610 may be arranged to cut extrudate from an extruder outlet from top to bottom and from bottom to top.

In some embodiments, the cutting device 600 may be configured such that a voltage needed to charge the biasing member 620 is variable and an amount of time needed to charge the biasing member 620 can be adjusted. In some such embodiments, a first voltage needed to charge the biasing member 620 requires a first amount of time and a second voltage needed to charge the biasing member 620 requires a second amount of time, and the first amount of time is unequal to the second amount of time. The cutting device 600 may be configured to create cut extrudate from an extruder into portions of extrudate, wherein each portion of extrudate has an approximately equal length.

The cutting device 600 may include a locking feature to securely fasten the cutting device 600 device to an extruder 400. In some embodiments, the cutting device 600 also includes a guard 660 sized and positioned to at least partially cover the blade 610. FIGS. 15A and 15B illustrate a guard 660 for a cutting device 600. The guard 660 may include one or more interlocks to prevent the blade 610 from moving unless the one or more guard interlocks are engaged. In some embodiments, the guard 660 may also include a biasing element 670 in the guard 660 to push the blade 610 into contact with the extruder outlet as it moves in the first direction and in the second direction.

FIG. 16 shows an exploded view of a cutting device 600 with a guard 660 mounted to an extruder 400. As shown in FIG. 16, the blade 610 clips on and off of the outlet of the extruder 400 below the auger. This configuration allows the blade 610 to be easily removed for cleaning. The cutting device 600 may be used to cut pasta or other food extrudate cleanly from an extruder. The biasing member 620 allows the blade 610 to move quickly to cleanly cut the food extrudate. The biasing element 670 in the guard 660 keeps the blade 610 in contact with the die face to prevent or minimize smearing of food ingredients on the die face.

FIG. 17 shows a method 800 of using a cutting device configured in accordance with the present disclosure (i.e., cutting device 600). Method 800 includes attaching a cutting device having a blade to an outlet of an extruder (802). In select embodiments, method 800 may also include locking the cutting device onto the extruder.

Method 800 continues with selecting a setting for the cutting device correlating to an amount of time between cutting movements of the blade (804). In some embodiments, method 800 specifically includes selecting a first setting for the cutting device corresponding to a first amount of time between movements of the blade. In these and other embodiments, method 800 may also include selecting a second setting for the cutting device corresponding to a second amount of time between movements of the blade. The first amount of time may not be equal to the second amount of time. Method 800 may also optionally include selecting a third setting for the cutting device corresponding to a third amount of time between movements of the blade. In some such embodiments, the third amount of time may not be equal to the first amount of time or the second amount of time Method 800 also includes operating the extruder to extrude one or more food ingredients (806). Method 800 further includes operating the cutting device to cut the one or more food ingredients released from the extruder with the blade at regular time intervals (808). The cutting movements of the blade may alternate directions in some embodiments. The blade may be arranged to cut the one or more food ingredients released from the extruder from left to right and from right to left in some embodiments. In other embodiments, the blade may be arranged to cut the one or more food ingredients released from the extruder from top to bottom and from bottom to top.

Method 800 may also optionally include placing a guard over the blade of the cutting device. In some such embodiments, method 800 may also include manually engaging a safety feature on the guard to permit operation of the cutting device.

Auto-IQ for Making Pasta

In another aspect, the present disclosure is also directed to a food processor configured to execute at least two food processing functions. Some existing stand mixers have pasta maker attachments that run off of a secondary outlet. Movement of the pasta maker attachment is driven by the main drive motor. Accordingly, speed and processing rates of the pasta maker and the mixer are linked. Existing pasta makers also extrude at a constant and pre-programmed rate. The presently disclosed devices are capable of mixing ingredients and then extruding the mixed food ingredients.

As described below in detail, the disclosed food processors may first mix ingredients together for a preprogrammed time (i.e., set by software, not by the user). Once the set amount of time has passed, the unit may provide a cue to the user (e.g., a beep or another alert) to open the door assembly to release mixed food ingredients into the extruder. Once the door assembly has been opened and all necessary safety features have been detected, the auger of the extruder will begin to run while the mixing componentry pulses at a preprogrammed rate to feed mixed food ingredients to the extruder.

A food processor 1000 is disclosed that includes a base 100, a mixing bowl 200 mountable on the base 100, a mixing assembly (having some or all components of gear assembly 300) arranged to mix the unmixed food items in the mixing bowl to produce the mixed food items, and an extruder 400 coupled to the base 100. The mixing bowl 200 includes a first opening arranged to receive unmixed food items and a second opening arranged to output mixed food items. The extruder 400 is arranged to receive the mixed food items via the second opening of the mixing bowl 200. The extruder 400 includes an extrusion housing including an input opening aligned with the second opening of the mixing bowl and an auger positioned within the extrusion housing. The auger is arranged to receive the mixed food items via the input opening from the second opening of the mixing bowl 200. While rotating, the auger extrudes the mixed food items via an extrusion output orifice.

The base 100 includes a first motor, a data store, and a controller. The first motor is operably coupled to drive the mixing assembly when the mixing bowl 200 is coupled to the base 100. The data store is arranged to store a plurality of computer-readable signals defining at least a first sequence of food processing instructions. The controller is in electronic communications with the data store and operable to execute the plurality of computer-readable instructions. The execution of the computer-readable instructions controls the first motor to actuate the mixing assembly for at least a first period of time to produce the mixed food items and controls rotation of the auger for at least a second period of time, causing extrusion of the mixed food items.

In some embodiments, the food processor 1000 also includes a user interface arranged to: receive input from a user associated with executing at least the first sequence; output status information associated with a first food processing sequence of the plurality of food processing sequences; and/or output one or more cues to a user to perform one or more actions associated with the first food processing sequence.

The extruder includes a door assembly configurable in an open position and a closed position via a handle operable by a user. The second opening is open when the door assembly is in the open position and the second opening is closed when the door assembly is in the closed position. In some such embodiments, the food processor is configured to output a first cue based on a first cue instruction from the controller. The first cue may include a user instruction to move the door assembly to one of the closed position and the open position. In these and other embodiments, the food processor may output a second cue based on a second cue instruction from the controller. The second cue may include a user instruction to add at least one unmixed food item of the unmixed food items to the mixing bowl.

The base 100 may include a motor operably coupled to the auger and arranged to rotate the auger, in some embodiments. In these and other embodiments, the controller may be arranged to operate the second motor during the first food processing sequence based on a first food processing program. In some embodiments, the extruder may also include a cutting device 600 arranged to cut portions of the extruded mixed food items being extruded from the extrusion output orifice. In some such embodiments, the controller may control operations of the cutting device 600 during the first food processing sequence based on a first food processing program. The controller may include a computer processor having any of the componentry shown in FIG. 18 and described below.

FIG. 18 is a block diagram of an electronic control system 900 of a food processor 1000 according to various implementations of the present disclosure. Control system 900 could represent an electronic control and/or processing system within a device such as, for example, a micro puree machine, a blender, an ice cream maker, an immersion blender, a stand mixer, or an attachment to any of such devices. Control system 900 may include a microcontroller, a processor, a system-on-a-chip (SoC), a client device, and/or a physical computing device and may include hardware and/or virtual processor(s). In some implementations, control system 900 and its elements as shown in FIG. 18 each relate to physical hardware and in some implementations one, more, or all of the elements could be implemented using emulators or virtual machines. Regardless, electronic control system 900 may be implemented on physical hardware.

As also shown in FIG. 18, control system 900 may include a user interface 912, having, for example, a keyboard, keypad, touchpad, or sensor readout (e.g., biometric scanner) and one or more output devices, such as displays, speakers for audio, LED indicators, and/or light indicators. Control system 900 may also include communications interfaces 910, such as a network communication unit that could include a wired communication component and/or a wireless communications component, which may be communicatively coupled to controller and/or processor 902. The network communication unit may utilize any of a variety of proprietary or standardized network protocols, such as Ethernet, TCP/IP, to name a few of many protocols, to effect communications between processor 902 and another device, network, or system. Network communication units may also comprise one or more transceivers that utilize the Ethernet, power line communication (PLC), Wi-Fi, cellular, and/or other communication methods.

Control system 900 may include a processing element, such as controller and/or processor 902, that contains one or more hardware processors, where each hardware processor may have a single or multiple processor cores. In one implementation, the processor 902 includes at least one shared cache that stores data (e.g., computing instructions) that are utilized by one or more other components of processor 902. For example, the shared cache may be a locally cached data stored in a memory for faster access by components of the processing elements that make up processor 902. Examples of processors include, but are not limited to a central processing unit (CPU) and/or microprocessor. Controller and/or processor 902 may utilize a computer architecture base on, without limitation, the Intel® 8051 architecture, Motorola® 68HCX, Intel® 80X86, and the like. The processor 902 may include, without limitation, an 8-bit, 12-bit, 16-bit, 32-bit, or 64-bit architecture. Although not illustrated in FIG. 18, the processing elements that make up processor 902 may also include one or more other types of hardware processing components, such as graphics processing units (GPUs), application specific integrated circuits (ASICs), field-programmable gate arrays (FPGAs), and/or digital signal processors (DSPs).

FIG. 18 illustrates that memory 904 may be operatively and communicatively coupled to processor 902. Memory 904 may be a non-transitory medium configured to store various types of data. For example, memory 904 may include one or more storage devices 908 that include a non-volatile storage device and/or volatile memory. Volatile memory, such as random-access memory (RAM), can be any suitable non-permanent storage device. The non-volatile storage devices 908 may include one or more disk drives, optical drives, solid-state drives (SSDs), tape drives, flash memory, read-only memory (ROM), and/or any other type memory designed to maintain data for a duration time after a power loss or shut down operation. In certain configurations, the non-volatile storage devices 908 may be used to store overflow data if allocated RAM is not large enough to hold all working data. The non-volatile storage devices 908 may also be use to store programs that are loaded into the RAM when such programs are selected for execution. Data store and/or storage devices 908 may be arranged to store a plurality of food processing instruction programs associated with a plurality of food processing sequences. Such food processing instruction programs may include instruction for controller and/or processor 902 to: start or stop one or more motors 914 (e.g., a mixing bowl motor or an extruder auger motor), operate the one or more motors 914 at certain periods during a particular food processing sequence, issue one or more cue instructions to user interface 912 that are output to a user to illicit a response, action, and/or input from the user.

Persons of ordinary skill in the art are aware that software programs may be developed, encoded, and compiled in a variety of computing languages for a variety of software platforms and/or operating systems and subsequently loaded and executed by processor 902. In one implementation, the compiling process of the software program may transform program code written in a programming language to another computer language such that the processor 902 is able to execute the programming code. For example, the compiling process of the software program may generate an executable program that provides encoded instructions (e.g., machine code instructions) for processor 902 to accomplish specific, non-generic, particular computing functions.

After the compiling process, the encoded instructions may be loaded as computer executable instructions or process steps to processor 902 from storage 908, from memory 904, and/or embedded within processor 902 (e.g., via a cache or on-board ROM). Processor 902 may be configured to execute the stored instructions or process steps in order to perform instructions or process steps to transform the electronic control system 900 into a non-generic, particular, specially programmed machine or apparatus. Stored data, e.g., data stored by a data store and/or storage device 908, may be accessed by processor 902 during the execution of computer executable instructions or process steps to instruct one or more components within control system 900 and/or other components or devices external to system 900.

User interface 912 can include a display, positional input device (such as a mouse, touchpad, touchscreen, or the like), keyboard, keypad, one or more buttons, or other forms of user input and output devices. The user interface components may be communicatively coupled to processor 902. When the user interface output device is or includes a display, the display can be implemented in various ways, including by a liquid crystal display (LCD) or a cathode-ray tube (CRT) or light emitting diode (LED) display, such as an OLED display. Sensors 906 may include one or more sensors that detect and/or monitor environmental conditions within or surrounding system 900, within or surrounding a mixing bowl 200, and/or within or surrounding extruder 400. Environmental conditions may include, without limitation, rotation, speed of rotation, and/or movement of a device or component (e.g., a motor), temperature, pressure, current, position of a device or component (e.g., whether door assembly 500 is open or closed), and/or the presence of a device or component (e.g., whether a lid 250 is connected to mixing bowl 200). Sensors 906 may also include one or more safety and/or interlock switches that prevent or enable operation of certain components, e.g., a motor, when certain conditions are met (e.g., enabling activation of the augur motor when a die is attached to the end of extruder 400). Persons of ordinary skill in the art are aware that electronic control system 900 may include other components well known in the art, such as power sources and/or analog-to-digital converters, not explicitly shown in FIG. 18.

In some implementations, control system 900 and/or processor 902 includes an SoC having multiple hardware components, including but not limited to, a microcontroller, microprocessor or digital signal processor (DSP) core and/or multiprocessor SoCs (MPSoC) having more than one processor cores, memory blocks including a selection of read-only memory (ROM), random access memory (RAM), electronically erasable programmable read-only memory (EEPROM) and flash memory, timing sources including oscillators and phase-docked loops, peripherals including counter-timers, real-time timers and power-on reset generators, external interfaces, including industry standards such as universal serial bus (USB), FireWire, Ethernet, universal synchronous/asynchronous receiver/transmitter (USART), serial peripheral interface (SPI), analog interfaces including analog-to-digital converters (ADCs) and digital-to-analog converters (DACs), and voltage regulators and power management circuits.

An SoC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. An SoC may include protocol stacks that drive industry-standard interfaces like a universal serial bus (USB).

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of control system 900 are implemented on a printed circuit board (PCB).

FIG. 19 shows a method 950 of processing food items using a food processor 1000 configured in accordance with the subject disclosure. Method 950 involves using a food processor having a base with a first motor, a mixing bowl coupled to the base, an extruder coupled the base and having a rotatable auger, a data store storing a plurality of food processing instruction programs associated with a plurality of food processing sequences, a user interface, and a controller. Method 950 includes receiving, by the mixing bowl, unmixed food items via a first opening (952). Method 950 continues with outputting, by the mixing bowl, mixed food items via a second opening (954). Method 950 also includes receiving, by the extruder, the mixed food items via the second opening (956). Method 950 continues with operating, by the controller, the first motor during the first food processing sequence based on a first food processing program associated with the first food processing sequence (958). Method 950 concludes with controlling, by the controller, rotation of the auger during the first food processing sequence (960).

Method 950 may also optionally include outputting, by the user interface, status information associated with a first food processing sequence of the plurality of food processing sequences, sending, by the controller, one or more cue instructions to the user interface associated with one or more cues to be output to the user, outputting, by the user interface, the one or more cues to the user to perform one or more actions associated with the first food processing sequence, and/or receiving, by the user interface, a user input associated with executing the first food processing sequence.

In select embodiments, a door assembly comprising a feed chute connects the second opening and the extruder, and the door assembly is configurable in an open position and a closed position. In the open position, the second opening is open and in the closed position the second opening is closed. In some such embodiments, the door assembly includes a handle operable by the user to move the door assembly to the open position or the closed position.

Method 950 may also optionally include outputting, by the user interface, a first cue based on a first cue instruction from the controller. The first cue may include a user instruction to move the door assembly to one of the closed position and the open position. In these and other embodiments, method 950 may also include outputting, by the user interface, a second cue based on a second cue instruction from the controller. The second cue may include a user instruction to add at least one unmixed food item of the unmixed food items to the mixing bowl.

In some embodiments, the base includes a second motor operably coupled to the auger and the second motor is arranged to rotate the auger. Method 950 may also optionally include operating, by the controller, the second motor during the first food processing sequence based on the first food processing program. In some embodiments, method 950 includes extruding, by the extruder, the mixed food items from an extrusion output orifice and cutting, by a cutting device, portions of the extruded mixed food items being extruded from the extrusion output orifice. In some such embodiments, method 950 also includes controlling, by the controller, operations of the cutting device during the first food processing sequence based on first food processing program.

While the disclosure particularly shows and describes particular embodiments, those skilled in the art will understand that various changes in form and details may exist without departing from the spirit and scope of the present application as defined by the appended claims. The scope of this present application intends to cover such variations. As such, the foregoing description of embodiments of the present application does not intend to limit the full scope conveyed by the appended claims.

We claim:

1. A food processing device comprising:
a base;
a mixing bowl mountable on the base, the mixing bowl including a first opening arranged to receive unmixed food items, and a second opening arranged to output mixed food items;
a mixing assembly arranged to mix the unmixed food items in the mixing bowl to produce the mixed food items;
an extruder arranged to receive the mixed food items from the second opening via a feed chute, the extruder comprising an extrusion chamber, an inlet arranged to align with the second opening of the mixing bowl, an outlet, and an auger configured to rotate within the extrusion chamber to move contents from the inlet to the outlet; and
a door assembly arranged to be movable between a first position that serves a barrier between the second opening and the inlet to prevent contents of the mixing bowl from entering the extruder and one or more second positions in which contents of the mixing bowl are enabled to exit the mixing bowl through the second opening and enter the feed chute and then the extruder through the inlet,
wherein the door assembly has a plunger positioned within the feed chute which extends from the second opening,
wherein the plunger is configured to pivot within the feed chute between the first position in which the plunger seals the second opening and a second position of the one or more second positions in which the plunger retracts within the feed chute and the second opening is open to the feed chute to permit entry of the mixed food items into the feed chute, and wherein the plunger is configured to force contents from the feed chute back into the mixing bowl when the plunger moves to the first position.

2. The food processing device of claim 1, wherein the mixing assembly includes a gear assembly comprising:

a central gear coupled to a drive shaft and arranged to rotate about a central axis of the mixing bowl in response to rotation of the drive shaft;

a first gear coupled to the central gear and extending radially away from the central axis in a first direction, the first gear arranged to rotate in response to rotation of the central gear, the first gear being coupled to a first accessory attachment connector configured to receive a detachable first accessory attachment; and a second gear coupled to the central gear and extending radially away from the central axis in a second direction different from the first direction, the second gear arranged to rotate in response to rotation of the central gear, the second gear being coupled to a second accessory attachment connector configured to receive a detachable second accessory attachment.

3. The food processing device of claim 2, wherein the gear assembly further comprises a third accessory attachment connector configured to receive a detachable third accessory attachment.

4. The food processing device of claim 3, wherein the detachable first accessory attachment is a beater, the detachable second accessory attachment is a hook, and the detachable third accessory attachment is a blade.

5. The food processing device of claim 1, wherein the mixing bowl comprises a sidewall defining the first opening at a top edge of the sidewall and a mixing cavity therein, wherein the food processing device further comprises a lid shaped to fit on the sidewall and cover the first opening, wherein the lid comprises one or more apertures sized to permit entry of liquid ingredients into the mixing cavity.

6. The food processing device of claim 1, further comprising an extrusion die positioned at the outlet of the extruder to form the mixed food items into a desired shape.

7. The food processing device of claim 1, wherein the auger has a helical rib that rotates within the extrusion chamber to move the mixed food items from the extruder inlet to the extruder outlet.

8. The food processing device of claim 7, wherein the helical rib is wound more loosely toward the inlet of the extruder than the outlet of the extruder.

\* \* \* \* \*